United States Patent
Park et al.

(10) Patent No.: US 10,380,768 B2
(45) Date of Patent: Aug. 13, 2019

(54) METHOD AND ELECTRONIC DEVICE FOR CONVERTING COLOR OF IMAGE

(71) Applicant: Samsung Electronics Co., Ltd., Gyeonggi-do (KR)

(72) Inventors: Sang-Uk Park, Gyeonggi-do (KR); Han-Sang Kim, Seoul (KR); Jung-Won Lee, Icheon (KR); Jung-Eun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/040,589

(22) Filed: Feb. 10, 2016

(65) Prior Publication Data
US 2016/0232686 A1    Aug. 11, 2016

(30) Foreign Application Priority Data
Feb. 10, 2015    (KR) .......................... 10-2015-0020521

(51) Int. Cl.
G06T 7/40    (2017.01)
G06T 11/00    (2006.01)
G06F 3/0481    (2013.01)

(52) U.S. Cl.
CPC .......... G06T 11/001 (2013.01); G06F 3/0481 (2013.01)

(58) Field of Classification Search
CPC .... G09G 5/02; G09G 5/06; G09G 2320/0666; G09G 2320/0626; G09G 5/346; G09G 2360/16; G09G 3/2003; G09G 2320/066; G06T 11/001; H04N 1/6058; G06Q 30/02
See application file for complete search history.

(56) References Cited

U.S. PATENT DOCUMENTS

| | | | |
|---|---|---|---|
| 5,982,924 A * | 11/1999 | Power | B32B 5/26 358/1.9 |
| 6,310,969 B1 | 10/2001 | Kim et al. | |
| 8,671,344 B2 | 3/2014 | Icho et al. | |
| 8,860,672 B2 | 10/2014 | Ewing, Jr. et al. | |
| 9,135,719 B1 * | 9/2015 | Dorner | G06T 7/408 |
| 9,652,868 B2 * | 5/2017 | Gunningham | G06T 11/001 |
| 9,916,613 B1 * | 3/2018 | Dorner | G06Q 30/0621 |

(Continued)

FOREIGN PATENT DOCUMENTS

| | | |
|---|---|---|
| EP | 2 682 849 | 1/2014 |
| KR | 19990086431 | 12/1999 |

(Continued)

OTHER PUBLICATIONS

U.S. Office Action dated May 21, 2019 issued in counterpart application No. 16/397,622, 12 pages.

*Primary Examiner* — Todd Buttram
(74) *Attorney, Agent, or Firm* — The Farrell Law Firm, P.C.

(57) ABSTRACT

An electronic device and a method are provided. The electronic device includes a display; and a processor configured to detect at least one representative color of an image using a color palette that is determined through information corresponding to at least a portion of the image displayed on the display and at least one of specified conditions of the electronic device, convert a color of an object displayed on the display using the representative color, and control the display to display the color-converted object.

28 Claims, 19 Drawing Sheets
(8 of 19 Drawing Sheet(s) Filed in Color)

(56) References Cited

U.S. PATENT DOCUMENTS

| | | | |
|---|---|---|---|
| 2005/0187943 A1* | 8/2005 | Finke-Anlauff | G06F 17/30044 |
| 2008/0079750 A1* | 4/2008 | Setlur | G06F 3/14 345/593 |
| 2009/0015593 A1* | 1/2009 | Kang | G06F 3/0481 345/581 |
| 2010/0077002 A1* | 3/2010 | Funch | G06F 3/0482 707/779 |
| 2011/0075924 A1 | 3/2011 | Shrestha et al. | |
| 2012/0045090 A1* | 2/2012 | Bobbitt | G06K 9/00771 382/103 |
| 2012/0045094 A1* | 2/2012 | Kubota | G06K 9/3233 382/103 |
| 2012/0243733 A1* | 9/2012 | Sawai | G06T 7/2006 382/103 |
| 2013/0007605 A1* | 1/2013 | Mihail-Cristian | G06F 17/211 715/255 |
| 2013/0148884 A1* | 6/2013 | Lee | G06K 9/00758 382/165 |
| 2014/0267384 A1 | 9/2014 | Kwon et al. | |
| 2015/0066923 A1* | 3/2015 | Ali | H04N 5/262 707/736 |
| 2015/0077639 A1 | 3/2015 | Chamaret et al. | |
| 2015/0100813 A1* | 4/2015 | Han | G09G 5/02 713/340 |
| 2015/0116227 A1* | 4/2015 | Lin | G06F 3/041 345/173 |
| 2015/0379732 A1* | 12/2015 | Sayre, III | G06T 7/408 382/164 |
| 2016/0232686 A1 | 8/2016 | Park et al. | |

FOREIGN PATENT DOCUMENTS

| | | |
|---|---|---|
| KR | 1020050017708 | 2/2005 |
| KR | 100849847 | 8/2008 |
| KR | 1020110016505 | 2/2011 |
| KR | 1020140112333 | 9/2014 |

* cited by examiner

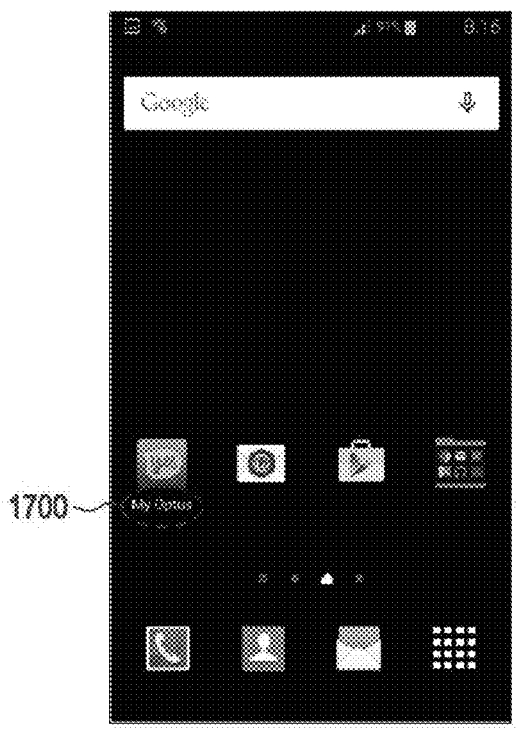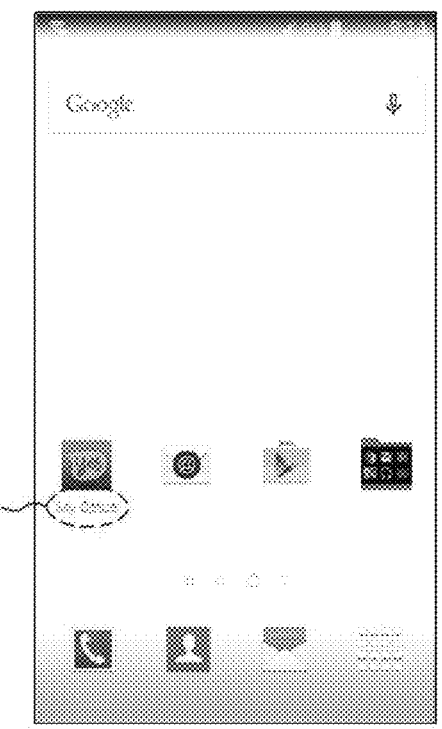
FIG.17A
(PRIOR ART)
FIG.17B
(PRIOR ART)

METHOD AND ELECTRONIC DEVICE FOR CONVERTING COLOR OF IMAGE

PRIORITY

This application claims priority under 35 U.S.C. § 119(a) to Korean Patent Application Serial No. 10-2015-0020521, which was filed in the Korean Intellectual Property Office on Feb. 10, 2015, the entire content of which is incorporated herein by reference.

BACKGROUND

1. Field of the Disclosure

The present disclosure relates generally to a method and electronic device for converting a color of an image, and more particularly, to a method and electronic device for converting a color of an image based on information corresponding to a portion of the image displayed on a display.

2. Description of the Related Art

In an electronic device, such as a smartphone, a tablet personal computer (PC) or a personal digital assistant (PDA), color design for a user interface (UI) is an important factor for maximizing aesthetics and usability for the user. Further, since the colors that surround objects (e.g., icons, texts, etc.) on a wallpaper may be changed, the colors of the objects are important factors that need to be considered in order to ensure visibility of the objects in any environment.

Color analysis of multimedia images and videos is often used in order to determine a color palette for a display device, and also to analyze the color frequency and determine a highlight color. In the field of image processing, the color analysis has been studied for a variety of purposes, such as content matching, image quality improvement, object detection, background separation, and comic effect filtering.

Detection of a representative color of a color image is the basis of the above-mentioned color analysis, and a variety of applications of such an analysis. In order to detect a representative color, input colors are quantized to determine the representative color on the basis of the high-frequency value (i.e., a frequency at which a color appears in the image). As a result, the representative color detection is dependent on the quantization technique and the frequency of each color. In performing representative color detection, various segmentation algorithms including the uniform/non-uniform quantization and the mean shift algorithm can be used, and the performance of each technique is determined by the operation speed, the current consumption, and whether a representative color suitable for a particular purpose is detected.

Existing UIs that operate in the color environment may not provide a high-level of visibility for the user at all times, since existing UIs utilize a single color (i.e., a fixed color) for certain objects, without considering the colors of the surrounding environment. Even when a conventional UI is designed to be displayed using two or more colors for objects, if the basic color (i.e., the default color) is similar to the color of the wallpaper, the visibility of the objects using the basic color may still be low.

FIGS. 17A and 17B are diagrams illustrating a change in visibility of an icon text due to the change of the wallpaper in a conventional electronic device Referring to FIGS. 17A and 17B, if a color of an icon text 1700 is white, the visibility of the icon text 1700 in FIG. 17B, in which the wallpaper of the electronic device is set to white, may be extremely lower than the visibility of the same icon text 1700 in FIG. 17A in which the wallpaper is set to black.

To change the color of an object (e.g., an icon, a text or the like) displayed on the screen, a representative color detection technique is used, in order to adjust for scenarios in which the color of the wallpaper is changed. To this end, it is necessary to determine a color palette. For example, even a color palette in RGB565 format corresponding to a lower-quality input image may have more than 60,000 colors. It is inefficient to determine the representative color from among a large plurality of candidates. Further, in certain electronic devices, such as a mobile terminal, there can be many constraints on power consumption and operation speed, there is a need to reduce the amount of computation by minimizing the number of candidates used for detection of the representative color. Therefore, in order to perform representative color detection, there is a need for a way to determine a relatively small number of color palettes by quantizing a given color space.

Korean Patent Application No. 10-2011-7000890 refers to a method for determining a representative color of a local red-green-blue (RGB) input using the mean shift algorithm, but this form of determination has a low execution speed and a high current consumption, due to the repetitive execution of the algorithm and the setting of a plurality of candidates.

Korean Patent Application No. 10-2003-0054731 refers to a method for determining a color palette by uniformly quantizing the RGB color space, so Korean Patent Application No. 10-2003-0054731 does not provide any disclosure that can be interpreted as determining the cognitive representative color candidates. The RGB color space can be expressed in the form of a three-dimensional (3D) cubic, as shown in FIGS. 18A and 18B, and each section of the cube is ambiguous in terms of color boundaries. FIG. 18A illustrates the RGB color space in the 3D coordinates, and FIG. 18B illustrates the RGB color space in the plane coordinates. Referring to FIGS. 18A and 18B, distribution of colors may not be linear in the RGB color space. In particular, since the gray is unevenly distributed in the RGB color space, uniform quantization is not suitable for determining the color palette with respect to the RGB color space.

Korean Patent Registration No. 0849847 and Korean Patent Publication No. 1999-0086431 refers to a method for analyzing the representative color through conversion into the commission on illumination (CIE) LCH color space consisting of lightness and color, or the hue/saturation/value (HSV) color space consisting of hue, saturation and value, in order to overcome the shortcomings arising from the non-linear nature of the RGB color space. By converting a color of an input image into a specific format, and then creating a histogram for the converted value, the most frequent color may be determined as a main color (i.e., a representative color).

However, there are limits in detecting a valid representative color, since these methods consider only the pixel values of the input image in determining the representative color. Further, since performance of quantization is based on the execution speed, the memory capacity and the power state are not considered, use of the above-described methods in an electronic device having significant hardware constraints, such as a smartphone, may cause the current consumption issues by increasing the central processing unit (CPU) clock. Further, these methods may not be suitable scenarios in which the real-time detection is required for a high-resolution input image, such as an ultra high definition (UHD) image.

FIGS. 19A and 19B illustrate a variety of conventional color palettes. FIG. 19A illustrates regular RGB palettes, and FIG. 19B illustrates non-regular RGB palettes. Referring to FIGS. 19A and 19B, color combinations such as a 16-color (4-bit) combination and a 64-color (6-bit) combination are defined based on the 8-color (3-bit) combination. Since such color palettes are defined for the color representation of a display device, the color palettes are not effective for the purpose of detecting the representative color of multimedia content. For example, in a selfie image captured using a smartphone, a skin color may be detected at high frequency, but the existing color palette may not include incarnadine which is one of the skin colors. Therefore, the color palette that is defined in the prior art and that does not consider the cognitive characteristics of the color of the object may not be suitable for detecting the representative color.

SUMMARY

An aspect of the present disclosure is to address at least the above-mentioned problems and/or disadvantages and to provide at least the advantages described below.

Accordingly, an aspect of the present disclosure is to provide a method and electronic device for converting a color of an image to provide a high-visibility color of an object to the user at all times even in the wallpaper of various colors using the representative color detection technique for images and videos, thereby increasing the user's satisfaction.

Another aspect of the present disclosure is to provide a method and electronic device for converting a color of an image to provide a quantized color palette adaptive to an input image using the metadata of the input image, thereby increasing the effectiveness of the representative color detection.

In accordance with an aspect of the present disclosure, an electronic device is provided. The electronic device includes a display; and a processor configured to detect at least one representative color of an image using a color palette that is determined through at least one of information corresponding to at least a portion of the image displayed on the display and at least one of specified conditions of the electronic device, convert a color of an object displayed on the display using the representative color, and control the display to display the color-converted object.

In accordance with another aspect of the present disclosure, a method for converting a color of an image is provided. The method includes detecting at least one representative color of an image using a color palette including colors that are determined through at least one of information corresponding to at least a portion of the image displayed on a screen of an electronic device and at least one of specified conditions of the electronic device; converting a color of an object displayed on the screen of the electronic device using the representative color; and displaying the color-converted object on the screen.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain embodiments of the present disclosure will be more apparent from the following detailed description taken in conjunction with the accompanying drawings, in which:

FIGS. 17A and 17B are diagrams illustrating a change in visibility of an icon text due to the change of the wallpaper in the conventional electronic device;

DETAILED DESCRIPTION

Figure 1:
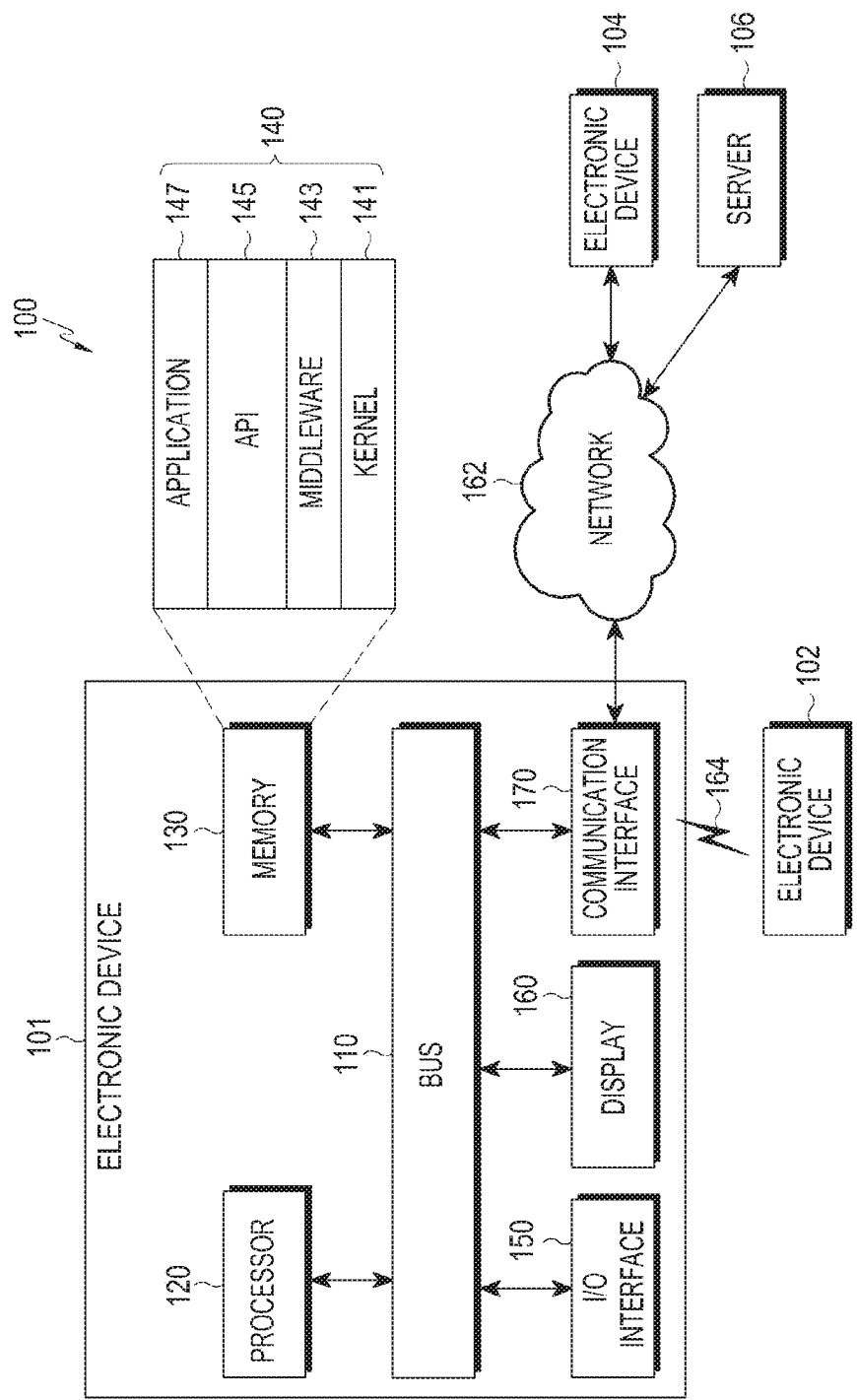
FIG. 1 is a diagram illustrating a network environment including an electronic device according to an embodiment of the present disclosure.

Hereinafter, various embodiments of the present disclosure will be disclosed with reference to the accompanying drawings. However, there is no intent to limit the present disclosure to particular embodiments, and it should be construed as including various modifications, equivalents, and/or alternatives according to the embodiments of the present disclosure.

In regard to the description of the drawings, like reference numerals refer to like elements.

Terms defined in the present disclosure are used for only describing a specific embodiment and may not have an intention to limit the scope of other embodiments. When using in a description of the present disclosure and the appended claims, a singular form may include a plurality of forms unless it is explicitly differently represented. Entire terms including a technical term and a scientific term used here may have the same meaning as a meaning that may be generally understood by a person of common skill in the art. Terms defined in general dictionaries among terms used herein have the same meaning as or a meaning similar to that of a context of related technology and are not analyzed to have an ideal or excessively formal meaning unless explicitly defined. In some case, terms defined in the present disclosure cannot be analyzed to exclude the present exemplary embodiments.

Herein, terms such as "having," "may have," "comprising," and "may comprise" indicate existence of a corresponding characteristic (such as an element such as a numerical value, function, operation, or component), but do not exclude existence of additional characteristics.

Herein, expressions such as "A or B," "at least one of A or/and B," and "one or more of A or/and B" may include all possible combinations of the listed items. For example, "A or B," "at least one of A and B," and "one or more of A or B" may indicate any of (1) including at least one of A, (2) including at least one of B, or (3) including both at least one of A and at least one of B.

Expressions such as "first," "second," "primarily," or "secondary," as used herein, may represent various elements regardless of order and/or importance, and do not limit corresponding elements. The expressions may be used to distinguish elements from each other. For example, a first user device and a second user device may represent different user devices, regardless of order or importance. For example, a first element may be referred to as a second element without deviating from the scope of the present disclosure, and similarly, a second element may be referred to as a first element.

When an element (such as a first element) is described as being "operatively or communicatively coupled" to or "connected" to another element (such as a second element), the first element can be directly connected to the second element or can be connected to the second element through a third element. However, when an element (such as a first element) is described as being "directly connected" or "directly coupled" to another element (such as a second element), it means that there is no intermediate element (such as a third element) between the first element and the second element.

The expression "configured to (or set)", as used herein is interchangeable with, for example, "suitable for," "having the capacity to," "designed to," "adapted to," "made to," and "capable of". The expression "configured to (or set)" is not limited to the definition "specifically designed to" with respect to hardware. The expression "apparatus configured to" may be used to indicate that the apparatus can operate together with another apparatus or component. For example, the phrase "a processor configured (or set) to perform A, B, and C" may refer to a generic-purpose processor (such as a CPU or an application processor) that can perform a corresponding operation by executing at least one software program stored at an exclusive dedicated processor (such as an embedded processor) for performing a corresponding operation or at a memory device.

An electronic device according to an embodiment of the present disclosure may include at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), motion picture experts group (MPEG) audio-layer 3 (MP3) player, a mobile medical device, a camera, or a wearable device. The wearable device may include at least one of an accessory-type wearable device (e.g., a watch, a ring, a bracelet, an anklet, a necklace, glasses, contact lenses, or a head mounted device (HMD)), a textile/clothing-integrated wearable device (e.g., electronic clothing), a body-mounted wearable device (e.g., skin pad or tattoo), or an implantable bio-wearable device (e.g., an implantable circuit).

The electronic device may be a home appliance. The home appliance may include at least one of, for example, a television (TV), a digital video disk (DVD) player, an audio player, a refrigerator, an air conditioner, a cleaner, an oven, a microwave oven, a washer, an air purifier, a set-top box, a home automation control panel, a security control panel, a TV set-top box, a game console, an electronic dictionary, an electronic key, a camcorder or a digital photo frame.

The electronic device may include at least one of various medical devices (e.g., various portable medical meters (e.g., a blood glucose meter, a heart rate meter, a blood pressure meter, a temperature meter or the like), magnetic resonance angiography (MRA), magnetic resonance imaging (MRI), computed tomography (CT), a medical camcorder, an ultrasonic device or the like), a navigation device, a global navigation satellite system (GNSS), an event data recorder (EDR), a flight data recorder (FDR), an automotive infotainment device, a marine electronic device (e.g., a marine navigation device, a gyro compass or the like), avionics, a security device, a car head unit, an industrial or home robot, an automatic teller machine (ATM) for banks, point of sales (POS) device for shops, or an Internet of Things (IoT) device (e.g., a light bulb, various sensors, an electricity or gas meter, a sprinkler device, a fire alarm, a thermostat, a streetlamp, a toaster, fitness equipment, a hot-water tank, a heater, a boiler, etc.).

The electronic device may include at least one of a part of the furniture or building/structure, an electronic board, an electronic signature receiving device, a projector, or various meters (e.g., meters for water, electricity, gas or radio waves). The electronic device may be one or a combination of the above-described devices. The electronic device may be a flexible electronic device. Electronic devices according to an embodiment of the present disclosure are not limited to the above-described devices, and may include a new electronic device that is provided through developments in technology.

Herein, the term 'user' may refer to a person who uses the electronic device, or a device (e.g., an intelligent electronic device) that uses the electronic device.

FIG. 1 illustrates a network environment including an electronic device according to an embodiment of the present disclosure.

Referring to FIG. 1, an electronic device 101 is included in a network environment 100. The electronic device 101 includes a bus 110, a processor 120, a memory 130, an input/output (I/O) interface 150, a display 160, and a communication interface 170. The electronic device 101 may exclude at least one of the components, or may further include other components in accordance with embodiments of the present invention.

The bus 110 may include, for example, a circuit that connects the components 110 to 170 to each other, and transfers the communication (e.g., a control message and/or data) between the components 110 to 170.

The processor 120 may include one or more of a central processing unit (CPU), an application processor (AP) or a communication processor (CP). The processor 120 may execute, for example, a control and/or communication-related operation or data processing for at least one other component of the electronic device 101.

The memory 130 may include a volatile and/or non-volatile memory. The memory 130 may store, for example, a command or data related to at least one other component of the electronic device 101. The memory 130 stores software and a program 140. The program 140 includes, for example, a kernel 141, a middleware 143, an application programming interface (API) 145, and an application program (or 'application') 147. At least some of the kernel 141, the middleware 143 or the API 145 may be referred to as an operating system (OS).

The kernel 141 may, for example, control or manage the system resources (e.g., the bus 110, the processor 120, the memory 130, etc.) that are used to execute the operation or function implemented in other programs (e.g., the middleware 143, the API 145, the application program 147, etc.). Further, the kernel 141 may provide an interface by which the middleware 143, the API 145 or the application program 147 can control or manage the system resources by accessing the individual components of the electronic device 101.

The middleware 143 may, for example, perform an intermediary role so that the API 145 or the application program 147 may exchange data with the kernel 141 by communicating with the kernel 141. Further, the middleware 143 may process one or more work requests received from the application program 147 according to their priority. For example, the middleware 143 may give priority capable of using the system resources (e.g., the bus 110, the processor 120, the memory 130 or the like) of the electronic device 101, to at least one of the application programs 147. For example, the middleware 143 may process the one or more work requests according to the priority given to at least one of the application programs 147, thereby performing scheduling or load balancing for the one or more work requests.

The API 145 is an interface by which the application 147 controls the function provided in the kernel 141 or the middleware 143, and may include at least one interface or function (e.g., a command) for, for example, file control, window control, image processing or character control.

The I/O interface 150 may serve as an interface that can transfer a command or data received from the user or other external device to the other components of the electronic device 101. Further, the I/O interface 150 may output a command or data received from the other components of the electronic device 101, to the user or other external devices.

The display 160 may include, for example, a liquid crystal display (LCD) display, a light emitting diode (LED) display, an organic light emitting diode (OLED) display, a microelectromechanical systems (MEMS) display, or an electronic paper display. The display 160 may, for example, display a variety of content (e.g., texts, images, videos, icons, symbols, etc.), for the user. The display 160 may include a touch screen, and may receive a touch input, a gesture input, a proximity input or a hovering input made by, for example, an electronic pen or a part of the user's body.

The communication interface 170 may establish communication between the electronic device 101 and an external device (e.g., a first external electronic device 102, a second external electronic device 104 or a server 106). The communication interface 170 may communicate with the second external electronic device 104 or the server 106 by being connected to a network 162 through wireless communication or wired communication.

The wireless communication may include at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro) or global system for mobile communication (GSM), as a cellular communication protocol. Further, the wireless communication includes short-range communication 164. The short-range communication 164 may include at least one of, for example, wireless fidelity (WiFi), Bluetooth (BT), near field communication (NFC) or global navigation satellite system (GNSS). GNSS may include at least one of, for example, global positioning system (GPS), global navigation satellite system (Glonass), Beidou navigation satellite system (Beidou), Galileo, or European global satellite-based navigation system, depending on the area or the bandwidth. Herein, the term "GPS" may be interchangeably used with the term "GNSS". The wired communication may include at least one of, for example, universal serial bus (USB), high definition multimedia interface (HDMI), recommended standard 232 (RS-232) or plain old telephone service (POTS). The network 162 may include a telecommunications network, for example, at least one of the computer network (e.g., a local area network (LAN) or a wide area network (WAN)), the Internet or the telephone network.

Each of the first and second external electronic devices 102 and 104 may be the same as or different from the electronic device 101. The server 106 may include a group of one or more servers. All or some of the operations executed in the electronic device 101 may be executed in one or multiple other electronic devices (. If the electronic device 101 must perform a certain function or service automatically or upon a request, the electronic device 101 may request at least some of the functions related thereto from the electronic devices 102 or 104, or the server 106), instead of or in addition to spontaneously executing the function or service. The other electronic devices may execute the requested function or additional function, and deliver the results to the electronic device 101. The electronic device 101 may process the received results intact or additionally, thereby providing the requested function or service. To this end, for example, the cloud computing, distributed computing, or client-server computing technology may be used.

Figure 2:
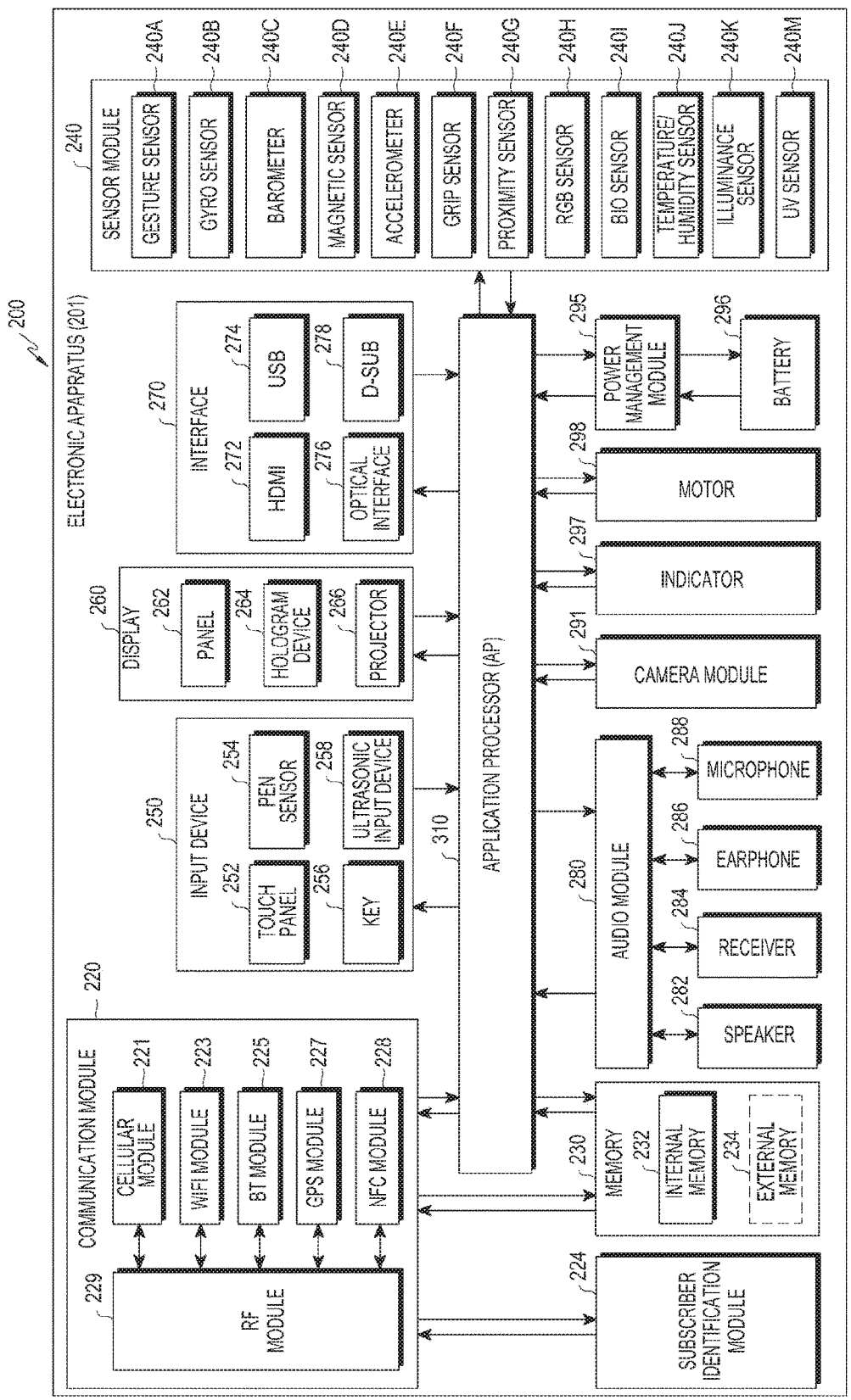
FIG. 2 is a block diagram of an electronic device according to an embodiment of the present disclosure.

FIG. 2 is a block diagram illustrating an electronic device according to an embodiment of the present disclosure.

Referring to FIG. 2, an electronic device 201 may include, for example, all or some of the components of the electronic device 101 shown in FIG. 1. The electronic device 201 includes at least one processor (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by running the operating system or application program, and may process and calculate a variety of data. The processor 210 may be implemented as a system on chip (SoC). The processor 210 may further include a graphic processing unit (GPU) and/or an image signal processor. The processor 210 may include at least some (e.g., a cellular module 221) of the components shown in FIG. 2. The processor 210 may load, on a volatile memory, a command or data received from at least one of other components (e.g., a non-volatile memory) and process the loaded data, and may store a variety of data in a non-volatile memory.

The communication module 220 may have a structure that is the same as or similar to that of the communication interface 170 in FIG. 1. The communication module 220 includes the cellular module 221, a WiFi module 223, a Bluetooth (BT) module 225, a GNSS module 227 (e.g., a GPS module, a Glonass module, a Beidou module, or a Galileo module), an NFC module 228, and a radio frequency (RF) module 229.

The cellular module 221 may provide a voice call service, a video call service, a messaging service or an Internet service over a communication network. The cellular module 221 may perform identification and authentication of the electronic device 201 within the communication network using the subscriber identification module (SIM) card 224. The cellular module 221 may have some of the functions that can be provided by the processor 210. The cellular module 221 may include a communication processor (CP).

Each of the WiFi module 223, the BT module 225, the GNSS module 227 or the NFC module 228 may include a processor for processing the data transmitted or received through the corresponding module. Two or more of the cellular module 221, WiFi module 223, the BT module 225, the GNSS module 227 or the NFC module 228 may be included in one integrated chip (IC) or IC package.

The RF module 229 may, for example, transmit and receive communication signals (e.g., RF signals). The RF module 229 may include a transceiver, a power amplifier module (PAM), a frequency filter, a low noise amplifier (LNA), or an antenna. In another embodiment, at least one of the cellular module 221, the WiFi module 223, the BT module 225, the GNSS module 227 or the NFC module 228 may transmit and receive RF signals through a separate RF module.

The subscriber identification module 224 may include, for example, a card with a subscriber identification module and/or an embedded SIM. The subscriber identification module 224 may include unique identification information (e.g., integrated circuit card identifier (ICCID)) or subscriber information (e.g., international mobile subscriber identity (IMSI)).

The memory 230 (e.g., the memory 130) includes an internal memory 232 and an external memory 234. The internal memory 232 may include at least one of, for example, a volatile memory (e.g., dynamic RAM (DRAM), static RAM (SRAM), synchronous dynamic RAM (SDRAM) or the like) or a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., a NAND flash, a NOR flash or the like)), hard drive, or solid state drive (SSD).

The external memory 234 may further include a flash drive, for example, compact flash (CF), secure digital (SD), micro secure digital (Micro-SD), mini secure digital (Mini-SD), extreme digital (xD), a multi-media card (MMC), a memory stick or the like. The external memory 234 may be functionally and/or physically connected to the electronic device 201 through various interfaces.

The sensor module 240 may measure the physical quantity or detect the operating status of the electronic device 201, and convert the measured or detected information into an electrical signal. The sensor module 240 may include at least one of, for example, a gesture sensor 240A, a gyro sensor 240B, a barometer 240C, a magnetic sensor 240D, an accelerometer 240E, a grip sensor 240F, a proximity sensor 240G, a color sensor (e.g., red-green-blue (RGB) sensor) 240H, a biosensor 240I, a temperature/humidity sensor 240J, an illuminance sensor 240K, or a ultra violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling at least one or more sensors belonging thereto. The electronic device 201 may further include a processor configured to control the sensor module 240, independently of or as a part of the processor 210, thereby to control the sensor module 240 while the processor 210 is in a sleep state.

The input device 250 includes a touch panel 252, a (digital) pen sensor 254, a key 256, or an ultrasonic input device 258. The touch panel 252 may use at least one of, for example, capacitive, resistive, infrared or ultrasonic scheme. The touch panel 252 may further include a control circuit. The touch panel 252 may further include a tactile layer, to provide a tactile or haptic feedback to the user.

The (digital) pen sensor 254 may be a part of the touch panel 252, or may include a separate recognition sheet. The key 256 may include, for example, a physical button, an optical key or a keypad. The ultrasonic input device 258 may detect ultrasonic waves generated in an input tool through a microphone 288, to identify the data corresponding to the detected ultrasonic waves.

The display 260 may include a panel 262, a hologram device 264, or a projector 266. The panel 262 may include a structure that is the same as or similar to that of the display 160 in FIG. 1. The panel 262 may be flexible, transparent or wearable. The panel 262, together with the touch panel 252, may be implemented as one module. The hologram device 264 may show stereoscopic images in the air using light interference. The projector 266 may display images by projecting light on a screen. The screen may be disposed inside or outside of the electronic device 201. The display 260 may further include a control circuit for controlling the panel 262, the hologram device 264, or the projector 266.

The interface 270 includes an HDMI interface 272, a USB interface 274, an optical interface 276 or D-subminiature (D-sub) interface 278. The interface 270 may be included in the communication interface 170 shown in FIG. 1. Additionally or alternatively, the interface 270 may include a mobile high-definition link (MHL) interface, a secure digital (SD) card/multi-media card (MMC) interface or an infrared data association (IrDA) interface.

The audio module 280 may convert sound and electrical signals bi-directionally. At least some components of the audio module 280 may be included in the I/O interface 150 shown in FIG. 1. The audio module 280 may process the sound information that is received or output through, for example, a speaker 1282, a receiver 1284, an earphone 2286 or the microphone 288.

The camera module 291 is capable of capturing still images and videos. The camera module 291 may include one or more image sensors (e.g., a front image sensor or a rear image sensor), a lens, an image signal processor (ISP), or a flash (e.g., an LED or xenon lamp).

The power management module 295 may manage, for example, the power of the electronic device 201. The power management module 295 may include a power management integrated circuit (PMIC), a charger integrated circuit (IC), or a battery gauge. The PMIC may have the wired and/or wireless charging schemes. The wireless charging scheme may include a magnetic resonance scheme, a magnetic induction scheme, or an electromagnetic scheme, and the power management module 295 may further include additional circuits (e.g., a coil loop, a resonant circuit, a rectifier or the like) for wireless charging. The battery or fuel gauge may, for example, measure the remaining capacity, charging voltage, charging current or temperature of the battery 296. The battery 296 may include, for example, a rechargeable battery and/or a solar battery.

The indicator 297 may indicate a specific status (e.g., boot status, message status, charging status, etc.) of the electronic device 201 or a part (e.g. the processor 210) thereof. The motor 298 may convert an electrical signal into mechanical vibrations, thereby generating a vibration or haptic effect. The electronic device 201 may include a processing device (e.g., a GPU) for mobile TV support. The processing device for mobile TV support may process media data that is based on the standards such as, for example, digital multimedia broadcasting (DMB), digital video broadcasting (DVB) or mediaFLO™.

Each of above-described components of the electronic device 201 may be configured with one or more components, the names of which may vary depending on the type of the electronic device 201. The electronic device 201 may include at least one of the above-described components, some of which may be omitted, or may further include additional other components. Some of the components of the electronic device 201 according to various embodiments of the present disclosure may be configured as one entity by being combined, thereby performing the functions of the separate components in the same manner.

Figure 3:
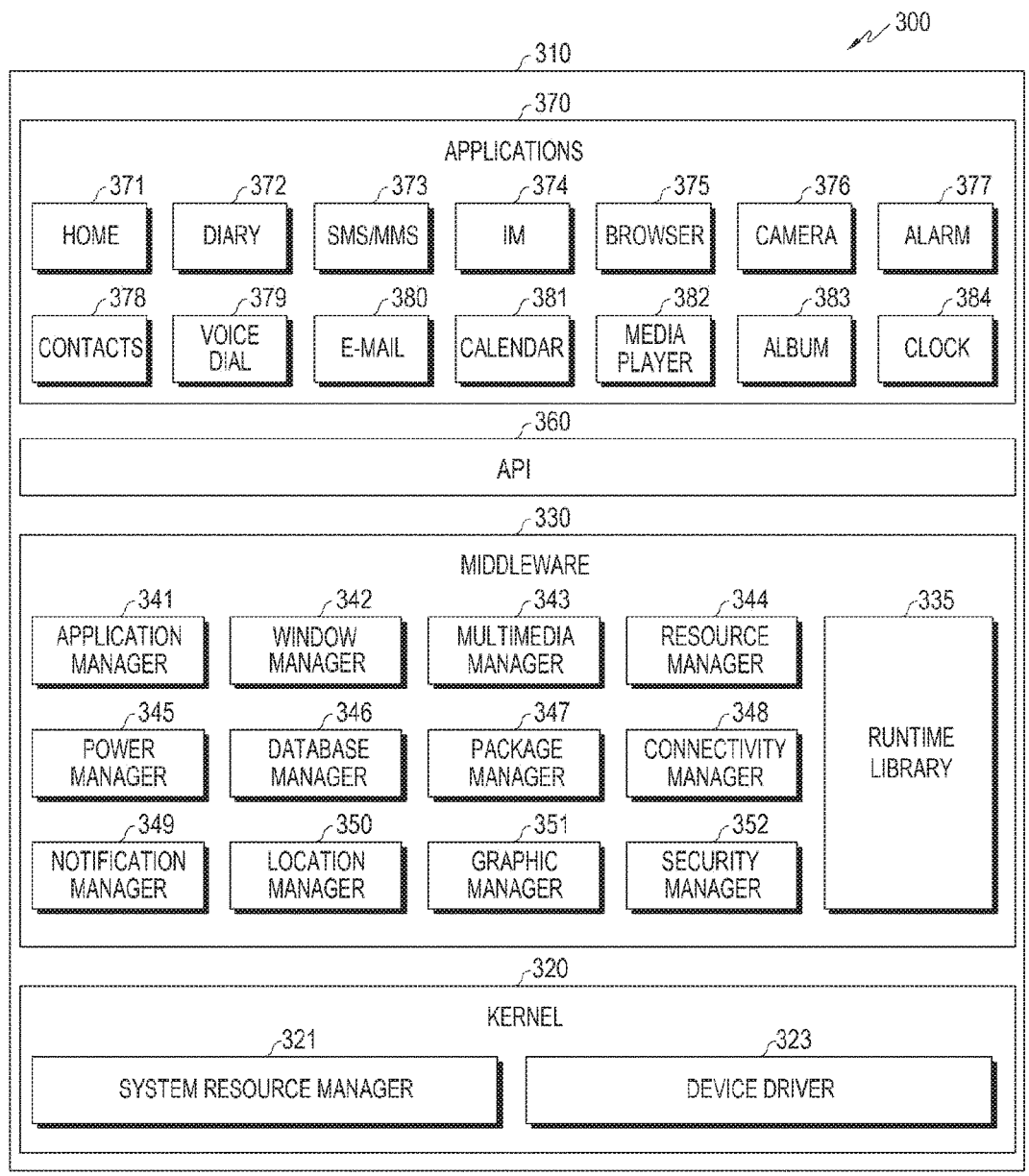
FIG. 3 is a block diagram of a program module according to an embodiment of the present disclosure.

FIG. 3 is a block diagram illustrating a program module according to an embodiment of the present disclosure.

Referring to FIG. 3, a program module 310 may include an operating system (OS) for controlling the resources related to an electronic device (e.g., the electronic device 101), and/or a variety of applications 147 that run on the operating system. The operating system may be, for example, Android®, iOS®, Windows®, Symbian®, Tizen®, Bada®, etc.

The program module 310 may include a kernel 320, a middleware 330, an API 360, and/or an application(s) 370. At least a part of the program module 310 may be preloaded on the electronic device, or downloaded from an external electronic device 102 or 104, or the server 106.

The kernel 320 (e.g., the kernel 141) may include a system resource manager 321 or a device driver 323. The system resource manager 321 may control, allocate or recover the system resources. The system resource manager 321 may include a process manager, a memory manager, a file system manager or the like. The device driver 323 may include a display driver, a camera driver, a Bluetooth driver, a shared memory driver, a USB driver, a keypad driver, a WiFi driver, an audio driver, or an inter-process communication (IPC) driver.

The middleware 330, for example, may provide a function that is required in common by the application(s) 370, or may provide various functions to the application 370 through the API 360 so that the application 370 may efficiently use the limited system resources within the electronic device. The middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a compiler uses to add a new function through a programming language while the application 370 is run. The runtime library 335 may perform an I/O management function, a memory management function, an arithmetic function, etc.

The application manager 341 may, manage the life cycle of at least one of the application(s) 370. The window manager 342 may manage graphic user interface (GUI) resources that are used on the screen. The multimedia manager 343 may determine formats related to playback of various media files, and encode or decode the media files using codecs for the formats. The resource manager 344 may manage resources, such as source code, a memory or a storage space for any of the application(s) 370.

The power manager 345 may manage the battery or power by operating with the basic input/output system (BIOS), and provide power information required for an operation of the electronic device. The database manager 346 may create, search or update the database to be used by at least one of the application(s) 370. The package manager 347 may manage installation or update of applications that are distributed in the form of a package file.

The connectivity manager 348 may manage wireless connection such as, for example, WiFi or Bluetooth. The notification manager 349 may display or notify events such as message arrival, appointments and proximity in a manner that doesn't interfere with the user. The location manager 350 may manage the location information of the electronic device. The graphic manager 351 may manage the graphic effect to be provided to the user, or the user interface related thereto. The security manager 352 may provide various security functions required for the system security or user authentication. If the electronic device 101 includes a phone function, the middleware 330 may further include a telephony manager for managing the voice or video call function of the electronic device.

The middleware 330 may include a middleware module that forms a combination of various functions of the above-described components. The middleware 330 may provide a module specialized for the type of the operating system in order to provide a differentiated function. Further, the middleware 330 may dynamically remove some of the existing components, or add new components.

The API 360 (e.g., the API 145) is a set of API programming functions, and may be provided in a different configuration depending on the operating system. For example, for Android™ or iOS™, the API 360 may provide one API set per platform, and for Tizen™, the API 360 may provide two or more API sets per platform.

The application 370 (e.g., the application program 147) includes one or more applications capable of providing functions such as a home 371, a dialer 372, a short message service/multimedia messaging service (SMS/MMS) 373, an instant message (IM) 374, a browser 375, a camera 376, an alarm 377, a contact 378, a voice dial 379, an Email 380, a calendar 381, a media player 382, an album 383, a clock 384, healthcare (e.g., for measuring the quantity of exercise, blood glucose levels, etc.), or environmental information provision (e.g., for providing information about the atmospheric pressure, the humidity, temperature, etc.).

The application 370 may include an application (hereinafter, 'information exchange application') for supporting information exchange between the electronic device 101 and external electronic devices 102 and 104. The information exchange application may include a notification relay application for delivering specific information to the external electronic devices, or a device management application for managing the external electronic devices.

The notification relay application may include a function of delivering notification information generated in other applications (e.g., an SMS/MMS application, an Email application, a healthcare application, an environmental information application, etc.) of the electronic device, to the external electronic devices 102 and 104. Further, the notification relay application may, for example, receive notification information from an external electronic device, and provide the received notification information to the user. The device management application may, for example, manage at least one function (e.g., a function of adjusting the turn-on/off of the external electronic device itself (or some components thereof) or the brightness (or the resolution) of the display) of the external electronic device communicating with the electronic device, and may manage (e.g., install, delete or update) an application operating in the external electronic device or a service (e.g., a call service or a messaging service) provided in the external electronic device.

The application 370 may include an application (e.g., a healthcare application) that is specified depending on the attributes (e.g., the attributes of an electronic device, the type of which is a mobile medical device) of the external electronic device 102 or 104. The application 370 may include an application received or downloaded from the external electronic device, such as the server 106 or the external electronic devices 102 and 104. The application 370 may include a preloaded application or a third party application that can be downloaded from the server. The names of the components of the program module 310 may vary depending on the type of the operating system.

At least a part of the program module 310 may be implemented by software, firmware, hardware or a combination thereof. At least a part of the program module 310 may be implemented (e.g., executed) by a processor (e.g., the processor 210). At least a part of the program module 310 may include a module, a program, a routine, an instruction set or a process, for performing one or more functions.

Figure 4:
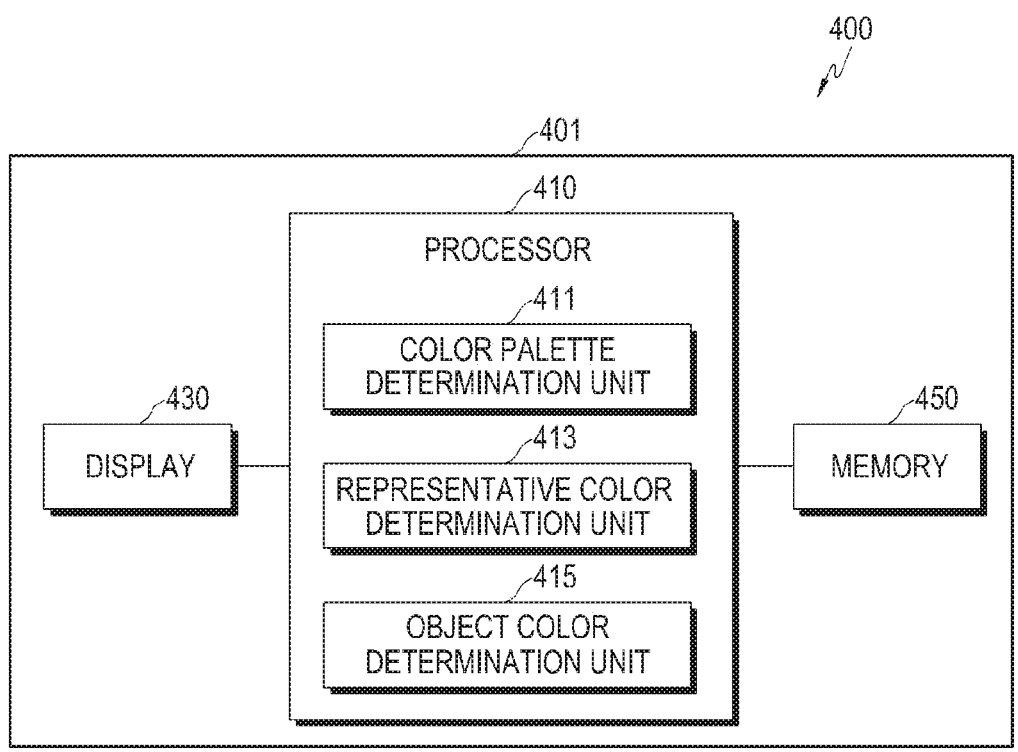
FIG. 4 is a block diagram of an electronic device for converting a color of an image according to an embodiment of the present disclosure.

FIG. 4 is a block diagram of an electronic device for converting a color of an image according to an embodiment of the present disclosure. The electronic device 401 may be, for example, the electronic device 101 shown in FIG. 1. Referring to FIG. 4, the electronic device 401 may include a processor 410, a display 430 and a memory 450.

The processor 410 may be the processor 120 shown in FIG. 1. The processor 410 may include one or a combination of, for example, hardware, software or firmware.

The processor 410 may detect at least one representative color of an image using a color palette that is determined through information corresponding to at least a portion of the image displayed on the display 430 and at least one of specified conditions of the electronic device 401, and convert a color of an object displayed on the display 430 using the representative color and display the color-converted object on the display 430.

The object may include a scene included in a photo or a video, a wallpaper, a text, or an icon that is a shortcut key for execution of an application.

The image may include at least one of a scene included in a photo or a video, a wallpaper, a text, or an icon. The image may be an image of the entire screen including all of the objects (e.g., wallpapers, texts, and icons which are shortcut keys for execution of applications) displayed on the display 430. Otherwise the image may be the wallpaper displayed on the display 430. The information corresponding to the image may include at least one of metadata of the image and a tag of the image.

The specified conditions of the electronic device 401 may include at least one of information in the memory 450, CPU clock information of the electronic device 401, and power status information of the electronic device 401.

The processor 410 may divide the image into at least two regions, and detect at least one representative color for each of the divided regions.

The processor 410 may divide the image into at least two regions depending on a depth value of the image, a complexity of the image, or the specified number of regions.

The processor 410 includes a color palette determination unit 411, a representative color determination unit 413 and an object color determination unit 415.

In order for the representative color determination unit 413 to effectively detect a representative color of the whole or a part of an image displayed on the display 430, a color palette composed of candidates of a representative color should be determined first. When determining the color palette, the color palette determination unit 411 may consider the following three conditions. A first condition is that color distinction between the candidates of the representative color should be visually clear. Further, a second condition is that, given that a user's UI operates in a digital environment, the color frequently used in multimedia content should be considered as a candidate. Further, a third condition is that an electronic device, to which a limited hardware environment is applied, such as a mobile terminal, should reduce the amount of computation by minimizing the number of candidates in order to detect the representative color.

In order to consider the above-described conditions, the color palette determination unit 411 may determine a color palette (also referred to as a quantized color palette) described in further detail later herein.

The representative color determination unit 413 may detect at least one representative color of the image, using the color palette determined in the color palette determination unit 411.

The representative color determination unit 413 may downscale the image at a specified ratio, and quantize a color of the downscaled image, using the color palette determined in the color palette determination unit 411. Further, the representative color determination unit 413 may calculate a histogram of the quantized color, and determine at least one representative color of the image in the histogram.

The representative color determination unit 413 may quantize the color of the downscaled image into a color of the color palette determined in the color palette determination unit 411.

The representative color determination unit 413 is described in further detail later herein.

The object color determination unit 415 may determine whether to change a color of at least one object displayed on the display 430 using the representative color determined in the representative color determination unit 413, and change the color of the object. The object may be, for example, a scene included in a photo or a video, a wallpaper, a text, or an icon.

The object color determination unit 415 may convert the color of the object into a specified recommended color corresponding to the representative color stored in the memory 450 depending on the similarity between the representative color and a basic color of the object.

The object color determination unit 415 may convert the color of the object into the specified recommended color corresponding to the representative color, determining that the similarity between the representative color and the basic color of the object is high, if a color distance value calculated by Equation (1) below is less than or equal to a threshold:

$$D_1 = \{(r_0-r_1)^2 + (g_0-g_1)^2 + (b_0-b_1)^2\}^{1/2} \quad (1)$$

In Equation (1), $D_1$ denotes the color distance value between the representative color and the basic color; $r_0$, $g_0$, and $b_0$ denote R, G and B values of the basic color, respectively; and $r_1$, $g_1$, and, $b_1$ denote R, G, and B values of the representative color, respectively.

The object color determination unit 415 may determine, if the representative color is a plurality, a degree of similarity between the representative color and the basic color of the object, by applying a weight corresponding to a color ratio of each of the representative colors to a color distance value of each of the representative colors for the basic color.

The object color determination unit 415 may convert the color of the object into the specified recommended color corresponding to the representative color, determining that the similarity between the representative color and the basic color of the object is high, if a color distance value calculated by Equation (2) below is less than or equal to a threshold:

$$D = \sum_{k=1}^{n} W_k \times D_k \quad (2)$$

In Equation (2), D denotes the color distance value between the representative color and the basic color; k denotes each of the representative colors; n denotes the total number of the representative colors; $W_k$ denotes a color ratio of the k-th representative color; $D_k$ denotes a color distance value $(D_k = \{(r_0-r_k)^2 + (g_0-g_k)^2 + (b_0-b_k)^2\}^{1/2})$ between the basic color and the k-th representative color; $r_0$, $g_0$, and, $b_0$ denote R, G, and B values of the basic color, respectively; and $r_k$, $g_k$, and $b_k$ denote R, G, and B values of the k-th representative color, respectively.

The object color determination unit 415 is described in further detail later herein.

Figure 5:
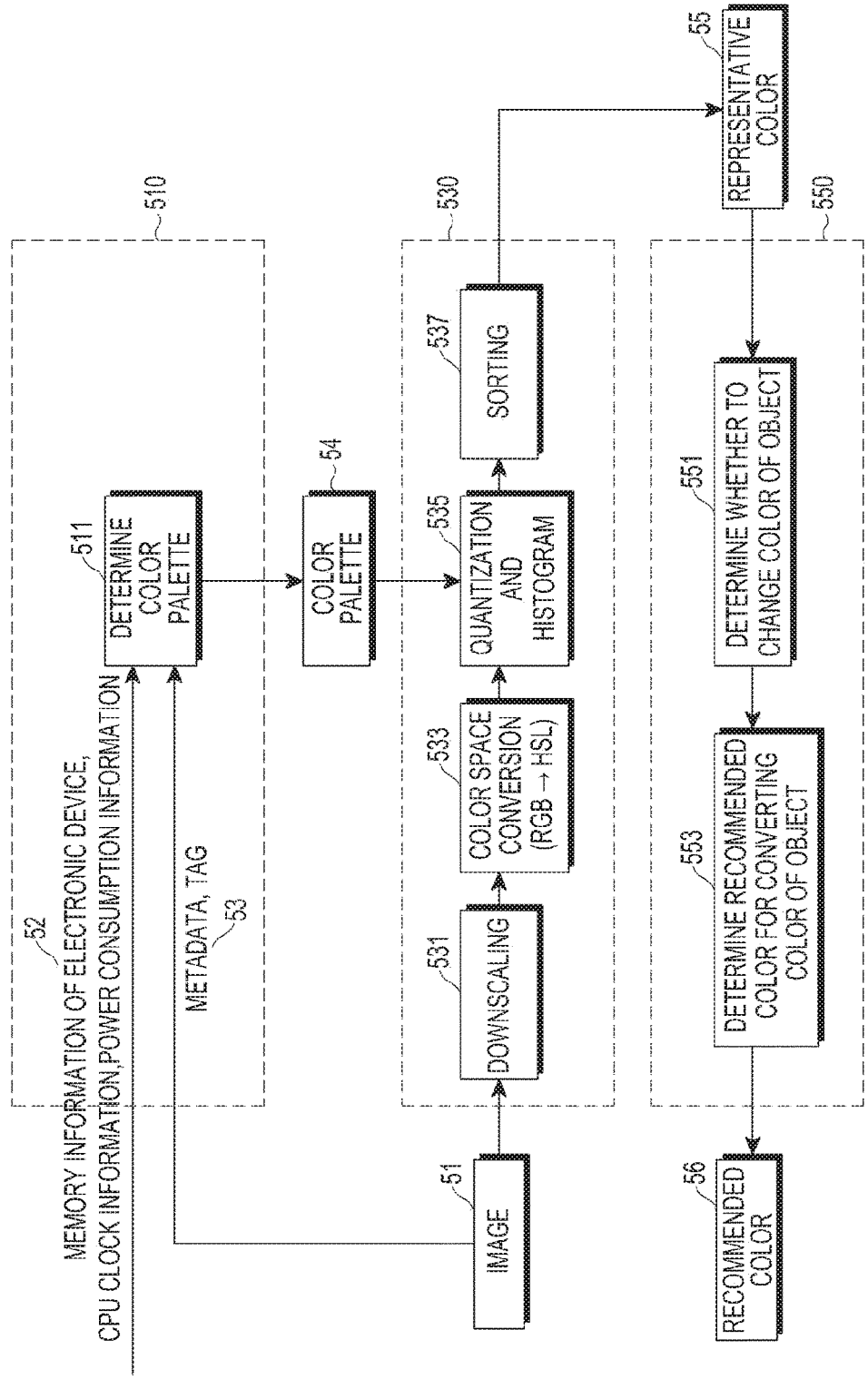
FIG. 5 is a flowchart illustrating a method performed by an electronic device for converting a color of an image according to an embodiment of the present disclosure.

FIG. 5 is a flowchart illustrating an operation of an electronic device for converting a color of an image according to an embodiment of the present disclosure.

Referring to FIG. 5, a color palette determination unit 510 determines, in step 511, a color palette 54 based on at least one 53 of at least one metadata of an image 51 displayed on a display and a tag of the image 51, and/or at least one 52 of information in the memory 450, CPU clock information and power status information (or power consumption information) of the electronic device. For example, the number of colors available in the color palette 54 may vary according an amount of available or remaining power in an electronic device (e.g., the number of colors may decrease as the remaining amount of power decreases), and/or according to whether the electronic device is connected to an external power supply (e.g., a greater number of colors may be available when the electronic device is connected to an external power supply, such as an AC adapter for charging a battery).

By using information that is included in at least one 53 of the metadata of the image 51 and the tag of the image 51 and indicates whether a human's face is detected, the color palette determination unit 510 may determine whether the image 51 is a portrait image. Depending on whether the image 51 is in a portrait orientation, the color palette determination unit 510 may determine the color palette 54 by changing a color value of the default color palette by adjusting a quantization level for an apricot color in the specified default color palette stored in the memory (e.g., the memory 450). Accordingly, it is possible to increase the effectiveness of the representative color. Further, for example, by using information that is included in at least one 53 of the metadata of the image 51 and the tag of the image 51 and indicates whether a human's face is detected, the color palette determination unit 510 may determine, as the color palette 54, a default color palette corresponding to a portrait image, from among the specified default color palettes, if it is determined that the image 51 is an image including a human's face. Moreover, for example, by using information that is included in at least one 53 of the metadata of the image 51 and the tag of the image 51, and includes a GPS-based shooting location, a shooting time, a camera exposure value during the image shooting, and the distributor of the image, the electronic device 401 may heuristically determines the background, and the season of the image 51, as well as whether the image was taken during the day or at night, in order to determine the color palette 54 by applying a specified condition.

Since the number of colors in the color palette 54 is inversely proportional to the effectiveness of the representative color, it is necessary to properly select the color palette.

Figure 6:
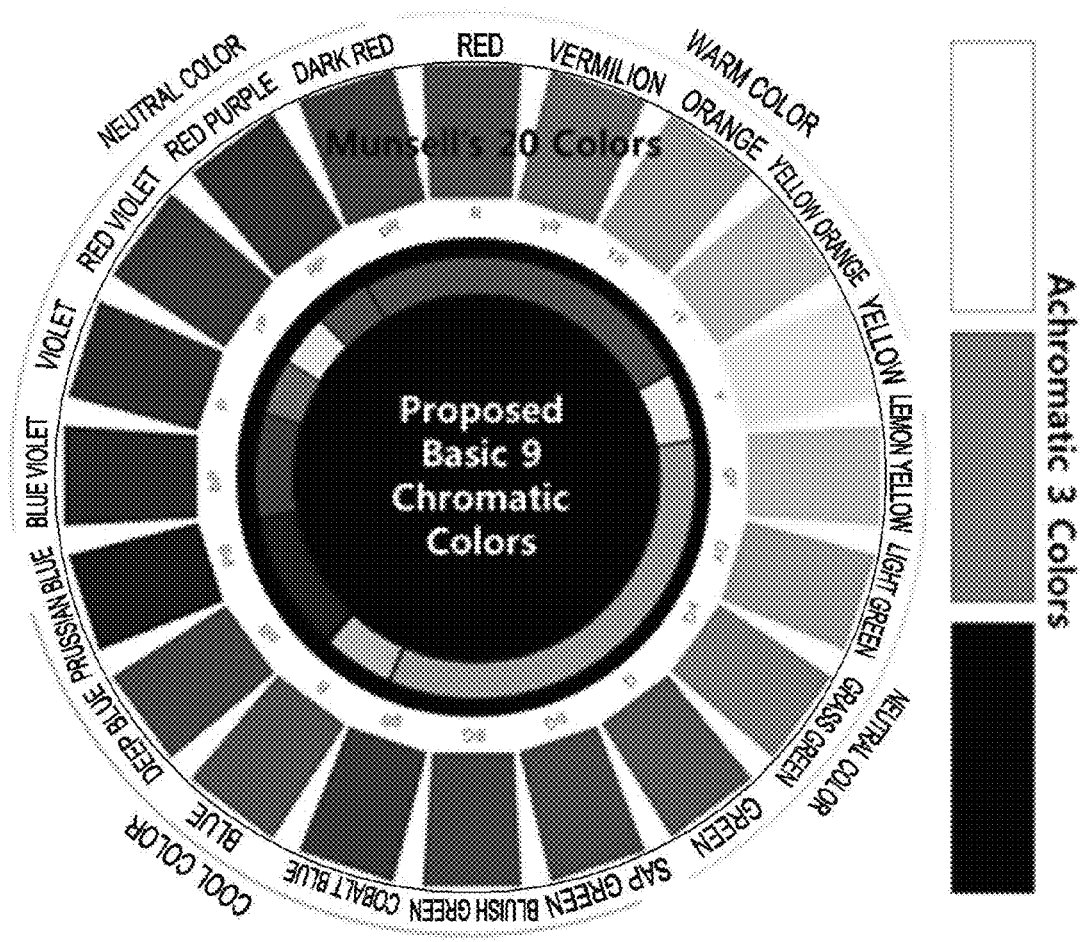
FIG. 6 is a diagram illustrating a conventional Munsell's 20-color wheel and the basic 12 colors defined according to an embodiment of the present disclosure.

FIG. 6 is a diagram illustrating the conventional Munsell's 20-color wheel commonly used as the basis of color in the design system, and the basic 12 colors defined according to an embodiment of the present disclosure. While determining colors that are big part of digital content, in order to minimize the number of the colors, an operation according to an embodiment of the present disclosure may define the color palette 54 as a quantized color palette that includes the basic 12 colors obtained by adding 3 achromatic colors of black, white and gray, to 9 colors of red, yellow, light green, light blue, blue, violet, pink, incarnadine and brown, which are obtained by simplifying the Munsell's 20 colors. In the quantized color palette, the incarnadine is a color that is determined considering the characteristics of an electronic device such as a mobile terminal handling many selfie images, and may play a big role in improvement of performance of the representative color detection. For the aforementioned 9 colors, the color palette 54 may be extended by utilizing the Munsell's 20 colors depending on the environment of the representative color detection. For example, if an efficiency of 4 bits (i.e., 4 bits of color output) is required, a color palette including 16 colors may be defined by adding 4 colors of orange, green, bluish green and Prussian blue. Further, depending on the analysis of the metadata or the tag of the image, a specific color space of the color palette 54 may be expanded, and the number of colors in the color palette 54 may be minimized in order to satisfy the conditions, such as operation constraints or power consumption based on a specific operation of the electronic device 401.

A representative color determination unit 530 (e.g., the representative color determination unit 413) may downscale the image 51, in step 531. The representative color determination unit 530 may downscale the image 51 at a specified ratio. When the image is downscaled in this manner, the aspect ratio is not changed, and the representative color determination unit 530 may use a nearest neighbor or a bilinear technique having a lower computational burden. For example, although 3,686,400 pixel values may be considered for an image with a pixel size of 2560*1440, if the image is downscaled to an image with a pixel size of 640*360, the representative color determination unit 530 may need to consider only 230,400 pixel values, which is 1/16 of 3,686,400 pixel values, contributing to gains in computation (i.e., lower computational requirements). Further, if the representative color determination unit 530 excludes 10% of the top, bottom, left and right of the image downscaled at a specified ratio as a way to increase a weight for a pixel value with respect to a region of interest (RoI) of the image, this exclusion may be helpful in further lowering computation requirements in performing the representative color detection.

Figure 7A:
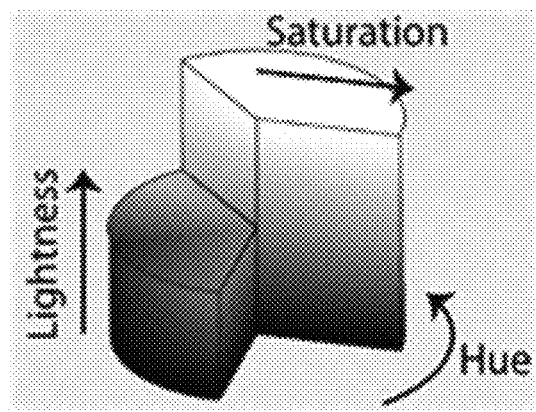
FIGS. 7A and 7B are diagrams illustrating a conventional HSL color space.
Figure 7B:
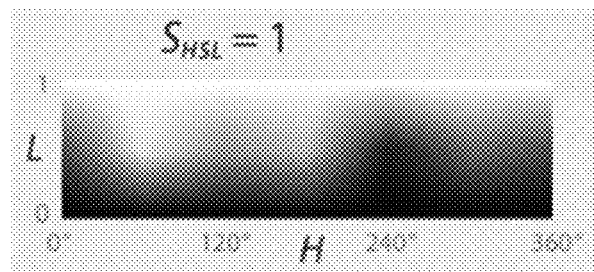

In step 533, the representative color determination unit 530 converts an RGB color space into a hue-saturation-lightness (HSL) color space in order to quantize the color of the image 51 downscaled at a specific ratio into a color of the color palette 54. The HSL color space may be obtained by simply linear-converting the RGB color space into a color space that is commonly used in computer graphics, and the orthogonal coordinate axes of the HSL color space may have characteristics that are close to the human's color cognitive characteristics. FIG. 7A illustrates the HSL color space in 3D coordinates, and FIG. 7B illustrates the HSL color space in plane coordinates. Referring to FIGS. 7A and 7B, the HSL color space may be configured in a cylindrical space, in which the hue is defined as an angle, the lightness as a height, and the saturation as a radius. Accordingly, unlike the RGB color space in which the border of the color is nonlinear, the HSL color space has a structure that is optimized for color segmentation.

Figure 8:
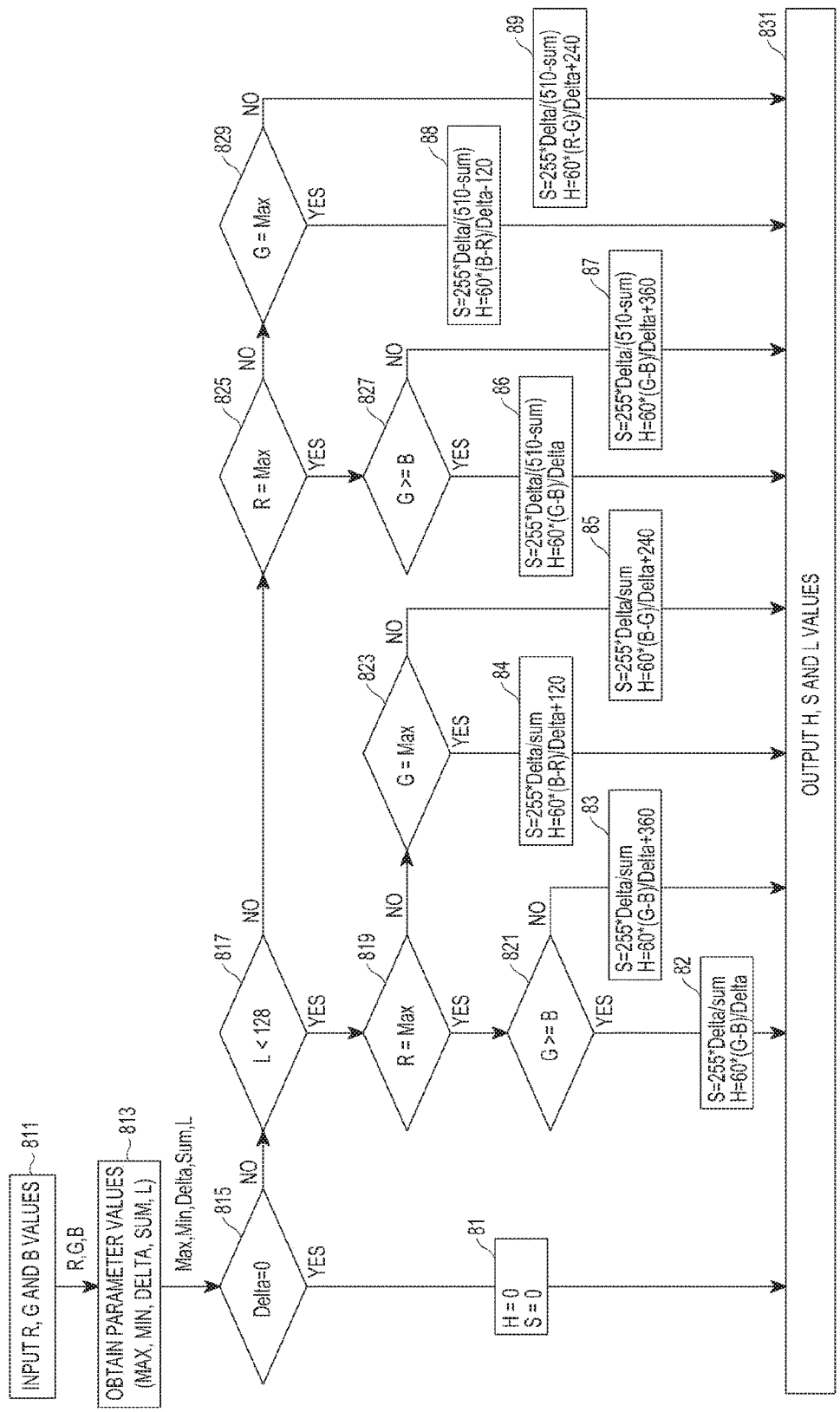
FIG. 8 is a flowchart illustrating a method performed by an electronic device for converting an RGB color space into an HSL color space according to an embodiment of the present disclosure.

FIG. 8 is a flowchart illustrating a method performed by an electronic device for converting an RGB color space into an HSL color space according to an embodiment of the present disclosure.

Referring to FIG. 8, the electronic device may be designed to increase the integer operations in order to improve the operation speed of the color space conversion.

In step 811, the representative color determination unit 530 receives R, G and B values from an image.

In step 813, the representative color determination unit 530 obtains parameter values Max, Min, Delta, Sum, and L, using the R, G, and B values. The Max value represents a maximum value among the R, G, and B values, and the Min value represents a minimum value among the R, G, and B values. The Delta, Sum, and L values are calculated by Equation (3) as follows:

Delta=Max−Min,

Sum=Max+Min, $$L=Sum/2^1 \quad (3)$$

In step 815, the representative color determination unit 530 determines whether the Delta value is zero 0. If the Delta value is 0, the representative color determination unit 530 determines H and S values as 0 in step 81, and outputs the H, S, and L values in step 831. If the Delta value is not 0, the representative color determination unit 530 performs step 817.

In step 817, the representative color determination unit 530 determines whether the L value is a value less than 128. If the L value is less than 128, the representative color determination unit 530 performs step 819, and if the L value is at least equal to 128, the representative color determination unit 530 performs step 825.

In step 819, the representative color determination unit 530 determines whether the R value and the Max value are the same value. If the R value and the Max value are the same value, the representative color determination unit 530 perform step 821, and if the R value and the Max value are not the same values, the representative color determination unit 530 performs step 823.

In step 821, the representative color determination unit 530 determines whether the G value is at least equal to the B value. If the G value is at least equal to the B value, the representative color determination unit 530 calculates S and H values using Equation (4) below in step 82, and outputs the H, S, and L values in operation 831.

$S=255*Delta/Sum$ $$H=60*(G-B)/Delta \quad (4)$$

If the G value is less than the B value, the representative color determination unit 530 calculates S and H values using Equation (5) below in operation 83, and output the H, S, and L values in step 831.

$S=255*Delta/Sum$ $$H=60*(G-B)/Delta+360 \quad (5)$$

In step 823, the representative color determination unit 530 determines whether the G value and the Max value are the same. If the G value and the Max value are the same, the representative color determination unit 530 calculates S and H values using Equation (6) below, in step 84, and output the H, S and L values in operation 831.

$S=255*Delta/Sum$ $$H=60*(B-R)/Delta+120 \quad (6)$$

However, if G value and the Max value are not the same, the representative color determination unit 530 calculates S and H values using Equation (7) below in step 85, and outputs the H, S, and L values in operation 831.

$S=255*Delta/Sum$ $$H=60*(R-G)/Delta+240 \quad (7)$$

In step 825, the representative color determination unit 530 determines whether the R value and the Max value are the same. If the R value and the Max value are the same, the representative color determination unit 530 performs step 827, and if the R value and the Max value are not the same, the representative color determination unit 530 performs step 829.

In step 827, the representative color determination unit 530 determines whether the G value is at least equal to the B value. If the G value is at least equal to the B value, the representative color determination unit 530 calculates S and H values using Equation (8) below in step 86, and outputs the H, S, and L values in step 831.

$S=255*Delta/(510-Sum)$ $$H=60*(G-B)/Delta \quad (8)$$

If the G value is less than the B value, the representative color determination unit 530 calculates S and H values using Equation (9) below in step 87, and output the H, S and L values in step 831.

$S=255*Delta/(510-Sum)$ $$H=60*(G-B)/Delta+360 \quad (9)$$

In step 829, the representative color determination unit 530 determines whether the G value and the Max value are the same. If the G value and the Max value are the same, the representative color determination unit 530 calculates S and H values using Equation (10) below in step 88, and outputs the H, S and L values in step 831.

$$S=255*\text{Delta}/(510-\text{Sum})$$

$$H=60*(B-R)/\text{Delta}+120 \quad (10)$$

If the G value and the Max value are not the same, the representative color determination unit 530 calculates S and H values using Equation (11) below in step 89, and outputs the H, S, and L values in step 831.

$$S=255*\text{Delta}/(510-\text{Sum})$$

$$H=60*(R-G)/\text{Delta}+240 \quad (11)$$

In step 535, the representative color determination unit 530 quantizes the H, S, and L values that are output according to the method of FIG. 8, into color values of the color palette 54, to calculate a histogram. For example, the representative color determination unit 530 may perform the quantization in FIG. 9 for all the pixel values of the image 51 that is downscaled at a specified ratio in step 531, and reflect the quantization results in a histogram buffer for calculation of frequency values.

Figure 9:
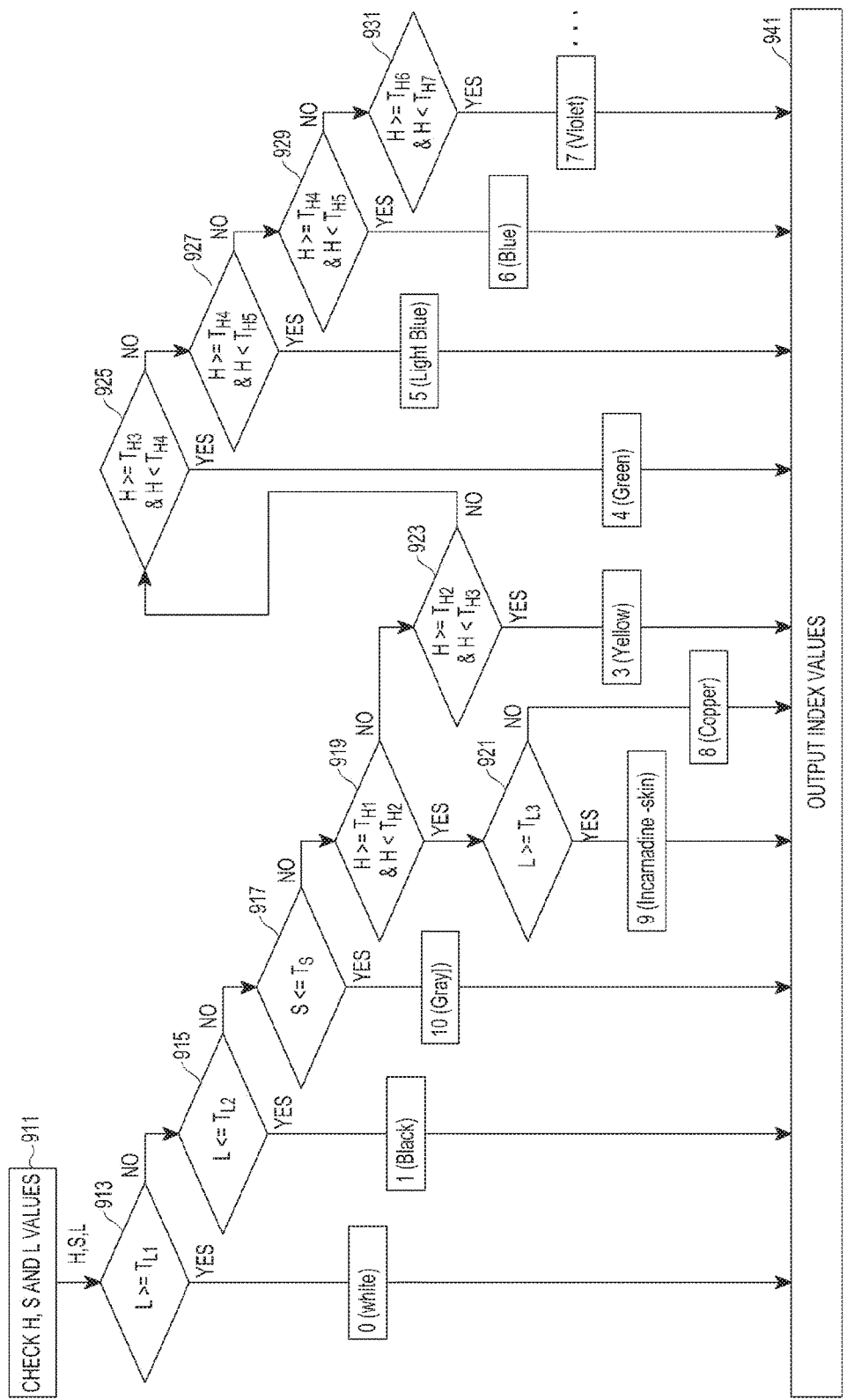
FIG. 9 is a flowchart illustrating a method performed by an electronic device for quantizing HSL according to various embodiments of the present disclosure.

FIG. 9 is a flowchart illustrating a method performed by an electronic device for quantizing HSL according to an embodiment of the present disclosure.

In the example according to FIG. 9, the color palette is a quantized color palette that includes basic 12 colors obtained by adding 3 achromatic colors of black, white and gray, to 9 colors of red, yellow, light green, light blue, blue, violet, pink, incarnadine and brown. The black, white and gray may be determined by threshold values $T_{L1}$, $T_{L2}$ and $T_S$ for identifying the achromatic colors, and the basic 9 colors may be determined by color threshold values $T_{H1}$, $T_{H2}$, $T_{H3}$, $T_{H4}$, $T_{H5}$, $T_{H6}$, $T_{H7}$ and $T_{H8}$, and an incarnadine threshold value $T_{L3}$. The quantization levels, the threshold values and the color threshold values may be determined depending on how the color palette 54 is defined.

In step 911, the representative color determination unit 530 checks the H, S, and L values that are output according to the method of FIG. 8.

In step 913, the representative color determination unit 530 determines whether the L value is at least equal to the $T_{L1}$ value. If the L value is at least equal to the $T_{L1}$ value, the representative color determination unit 530 may determine a pixel value of the image 51 downscaled at a specified ratio as an index 0 (white), and output the determined index value in operation 941. Further, the representative color determination unit 530 may increase a frequency value of the index 0 in the histogram buffer, by 1. If the L value is less than the $T_{L1}$ value, the representative color determination unit 530 may perform operation 915.

In step 915, the representative color determination unit 530 determines whether the L value is less than or equal to the $T_{L2}$ value. If the L value is less than or equal to the $T_{L2}$ value, the representative color determination unit 530 determines a pixel value of the image 51 downscaled at a specified ratio as an index 1 (black), and output the determined index value in step 941. Further, the representative color determination unit 530 may increase a frequency value of the index 1 in the histogram buffer, by 1. If the L value is greater than the $T_{L2}$ value, the representative color determination unit 530 may perform step 917.

In step 917, the representative color determination unit 530 may determine whether the S value is less than or equal to the $T_S$ value. If the S value is less than or equal to the $T_S$ value, the representative color determination unit 530 determines a pixel value of the image 51 downscaled at a specified ratio as an index 10 (gray), and output the determined index value in step 941. Further, the representative color determination unit 530 may increase a frequency value of the index 10 in the histogram buffer, by 1. If the S value is greater than the $T_S$ value, the representative color determination unit 530 performs step 919.

In step 919, the representative color determination unit 530 determines whether the H value is at least equal to the $T_{H1}$ value, and the H value is less than the $T_{H2}$ value. If the H value is at least equal to the $T_{H1}$ value, and the H value is less than the $T_{H2}$ value, the representative color determination unit 530 may perform operation 921, and if the conditions (the H value is greater than or equal to the $T_{H1}$ value, and the H value is less than the $T_{H2}$ value) of the H value in step 919 is not satisfied, the representative color determination unit 530 performs step 923.

In step 921, the representative color determination unit 530 determines whether the L value is at least equal to the $T_{L3}$ value. If the L value is at least equal to the $T_{L3}$ value, the representative color determination unit 530 determines a pixel value of the image 51 downscaled at a specified ratio as an index 9 (incarnadine), and outputs the determined index value in operation 941. Further, the representative color determination unit 530 increases a frequency value of the index 9 in the histogram buffer, by 1. If the L value is less than the $T_{L3}$ value, the representative color determination unit 530 may determine a pixel value of the image 51 downscaled at a specified ratio as an index 8 (copper), and output the determined index value in operation 941. Further, the representative color determination unit 530 increases a frequency value of the index 8 in the histogram buffer, by 1.

In step 923, the representative color determination unit 530 determines whether the H value is at least equal to the $T_{H2}$ value, and the H value is less than the $T_{H3}$ value. If the H value is greater than or equal to the $T_{H2}$ value, and the H value is less than the $T_{H3}$ value, the representative color determination unit 530 determines a pixel value of the image 51 downscaled at a specified ratio as an index 3 (yellow), and outputs the determined index value, in step 941. Further, the representative color determination unit 530 increases a frequency value of the index 3 in the histogram buffer, by 1. If the conditions (the H value is greater than or equal to the $T_{12}$ value, and the H value is less than the $T_{H3}$ value) of the H value in step 923 are not satisfied, the representative color determination unit 530 performs step 925.

In step 925, the representative color determination unit 530 determines whether the H value is at least equal to the $T_{H3}$ value, and the H value is less than the $T_{H4}$ value. If the H value is greater than or equal to the $T_{H3}$ value, and the H value is less than the $T_{H4}$ value, the representative color determination unit 530 determines a pixel value of the image 51 downscaled at a specified ratio as an index 4 (green), and outputs the determined index value in step 941. Further, the representative color determination unit 530 increases a frequency value of the index 4 in the histogram buffer, by 1. If the conditions (the H value is at least equal to the $T_{H3}$ value, and the H value is less than the $T_{H4}$ value) of the H value in step 925 is not satisfied, the representative color determination unit 530 may perform step 927.

In step 927, the representative color determination unit 530 determines whether the H value is at least equal to the $T_{H4}$ value, and the H value is less than the $T_{H5}$ value. If the H value is at least equal to the $T_{H4}$ value, and the H value is less than the $T_{H5}$ value, the representative color determination unit 530 determines a pixel value of the image 51 downscaled at a specified ratio as an index 5 (light blue), and outputs the determined index value in step 941. Further, the representative color determination unit 530 may increase a frequency value of the index 5 in the histogram buffer, by 1. If the conditions (the H value is at least equal to the $T_{H4}$ value, and the H value is less than the $T_{H5}$ value) of the H value step 927 is not satisfied, the representative color determination unit 530 performs step 929.

In step 929, the representative color determination unit 530 determines whether the H value is at least equal to the $T_{H5}$ value, and the H value is less than the $T_{H6}$ value. If the H value is at least equal to the $T_{H5}$ value, and the H value is less than the $T_{H6}$ value, the representative color determination unit 530 determines a pixel value of the image 51 downscaled at a specified ratio as an index 6 (blue), and outputs the determined index value in step 941. Further, the representative color determination unit 530 also increases a frequency value of the index 6 (blue) in the histogram buffer, by 1. If the conditions (the H value is at least equal to the $T_{H5}$ value, and the H value is less than the $T_{H6}$ value) of the H value in step 929 is not satisfied, the representative color determination unit 530 performs step 931.

In step 931, the representative color determination unit 530 determines whether the H value is at least equal to the $T_{H6}$ value, and the H value is less than the $T_{H7}$ value. If the H value is at least equal to the $T_{H6}$ value, and the H value is less than the $T_{H7}$ value, the representative color determination unit 530 determines a pixel value of the image 51 downscaled at a specified ratio as an index 7 (violet), and outputs the determined index value in operation 941. Further, the representative color determination unit 530 increases a frequency value of the index 7 in the histogram buffer, by 1.

In step 537, the representative color determination unit 530 may sort the quantized color values (or index values) of the image 51 downscaled at a specified ratio, to determine at least one representative color 55. For example, the representative color determination unit 530 may sort the quantized color values in the order of high frequency in the histogram buffer in which the quantized color values of the image 51 downscaled at a specified ratio are stored, to determine one color having the maximum frequency value as a representative color 55. Further, for example, if the wallpaper has an uneven color, i.e., if there is a single color having the maximum frequency value, as well as other colors in the wallpaper for which a difference in frequency value with the frequency value of the one color having the maximum frequency value is less than or equal to a specified threshold value, the representative color determination unit 530 may determine these other colors as a plurality of representative colors 55. Further, in the representative color determination unit 530, various sorting techniques including quick sorting may be applied. Further, in order to effectively apply the color conversion, it is possible to improve the operation speed by finding colors having top number 'n' of significant frequency values.

An object color determination unit 550 determines, in step 551, whether to convert a color of an object. The object color determination unit 550 may determine whether to convert a color of an object by checking the similarity between the representative color 55 that is determined according to the operations of the representative color determination unit 530, and the basic color of the object. For example, if the degree of similarity between the representative color 55 and the basic color is high, the object color determination unit 550 may determine to convert the color of the object. If the degree of similarity between the representative color 55 and the basic color is low, the object color determination unit 550 may determine not to convert the color of the object.

The object color determination unit 550 may determine whether to convert a color of an object in a different way, depending on the number of the representative colors 55 that are determined according to the operations of the representative color determination unit 530.

For example, if there is only one representative color 55 that is determined according to the operations of the representative color determination unit 530, the object color determination unit 550 may determine whether to convert a color of an object, using Equation (12) below.

$$D_1=\{(r_0-r_1)^2+(g_0-g_1)^2+(b_0-b_1)^2\}^{1/2} \qquad (12)$$

In Equation (12) above, $D_1$ denotes the color distance value between the representative color and the basic color; $r_0$, $g_0$, and $b_0$ denote R, G, and B values of the basic color, respectively; and $r_1$, $g_1$, and $b_1$ denote R, G, and B values, respectively, of the representative color.

In accordance with Equation (12), the object color determination unit 550 may calculate a color distance value between one representative color of the image 51 downscaled at a specified ratio and a basic color of the object, and determine whether the visibility is ensured, depending on the calculated color distance value. For example, if the calculated color distance value is less than or equal to a specified threshold value, the object color determination unit 550 may determine that the similarity between the representative color and the basic color is high. Further, for example, if the calculated color distance value is greater than a specified threshold value, the object color determination unit 550 may determine that the similarity between the representative color and the basic color is low.

For example, if multiple representative colors 55 are determined according to the operations of the representative color determination unit 530, the object color determination unit 550 may determine whether to convert a color of an object, using Equation (13) below.

$$D = \sum_{k=1}^{n} W_k \times D_k \qquad (13)$$

In Equation (13), D denotes the color distance value between the representative color and the basic color; k denotes each of the representative colors; n denotes the total number of the representative colors; $W_k$ denotes a color ratio of the k-th representative color; $D_k$ denotes a color distance value ($D_k=\{(r_0-r_k)^2-(g_0-g_k)^2-(b_0-b_k)^2\}^{1/2}$) between the basic color and the k-th representative color; $r_0$, $g_0$, and $b_0$ denote R, G, and B values of the basic color, respectively; and $r_k$, $g_k$ and $b_k$ denote R, G, and B values of the k-th representative color, respectively.

In accordance with Equation (13), the object color determination unit 550 may calculate a color distance value between a plurality of representative colors and a basic color as one color distance value, considering the ratio at which each representative color occupies in all pixels of the image 51 downscaled at a specified ratio. By applying a weight corresponding to a color ratio of each of a plurality of representative colors to a distance value of each of the plurality of representative colors for the basic color, to sum up distance values of the plurality of representative colors for the basic color, to which the weight is applied, the object color determination unit 550 may calculate a final color distance value between the representative color of the image 51 downscaled at a specified ratio and the basic color of the object.

Further, in accordance with Equation (13), the object color determination unit 550 may calculate a color distance value between the representative color of the image 51 downscaled at a specified ratio and the basic color of the object, and determine whether the visibility is ensured, depending on the calculated color distance value. For example, if the calculated color distance value is less than or equal to a specified threshold value, the object color determination unit 550 may determine that the degree of similarity between the representative color and the basic color is high. Further, for example, if the calculated color distance value is greater than a specified threshold value, the object color determination unit 550 may determine that the degree of similarity between the representative color and the basic color is low.

If the object color determination unit 550 determines to convert the color of the object in step 551, the object color determination unit 550 determines a recommended color to convert a color of the object into, in step 553. The object color determination unit 550 may use specified recommended colors in determining the recommended color for converting a color of the object. For example, the object color determination unit 550 may convert a color of the object into a specified recommended color corresponding to the representative color 55 that is determined according to the operations of the representative color determination unit 530.

Figure 10:
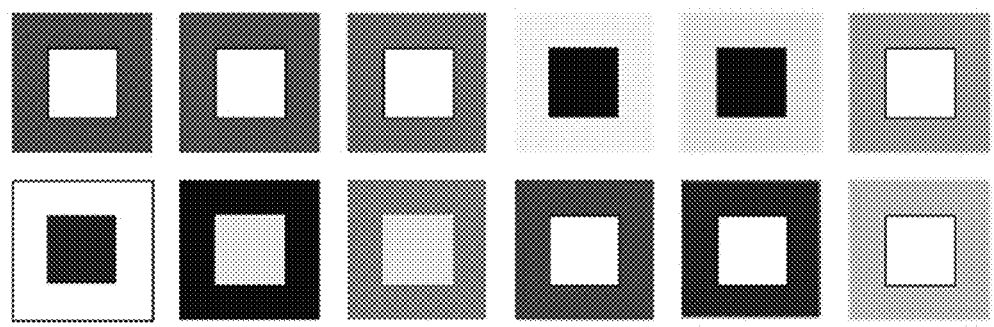
FIG. 10 is a diagram illustrating specified recommended colors corresponding to twelve representative colors according to an embodiment of the present disclosure.

The specified recommended colors may be stored in the memory 450 and may be the colors shown in FIG. 10.

FIG. 10 illustrates specified recommended colors corresponding to twelve representative colors according to an embodiment of the present disclosure. Referring to FIG. 10, the twelve basic colors of the quantized color palette and high-explicitly colors for the twelve basic colors are illustrated. When the representative colors are brown, red, pink, light green, light blue, blue and violet, the recommended color may be specified as white. When the representative colors are incarnadine and yellow, the recommended color may be specified as black. When the representative colors are black and gray, the recommended color may be specified as yellow. When the representative color is white, the recommended color may be specified as blue. The recommended colors corresponding to the representative colors may be changed during the manufacturing, or by the user's manipulation. Further, the representative colors or the specified recommended colors corresponding to the representative colors may be changed depending on the colors in the color palette. The specified recommended colors may be included in a separate color palette. For example, the white, black, yellow and blue, which are the recommended colors in FIG. 10, may be included in a separate color palette.

Figure 11:
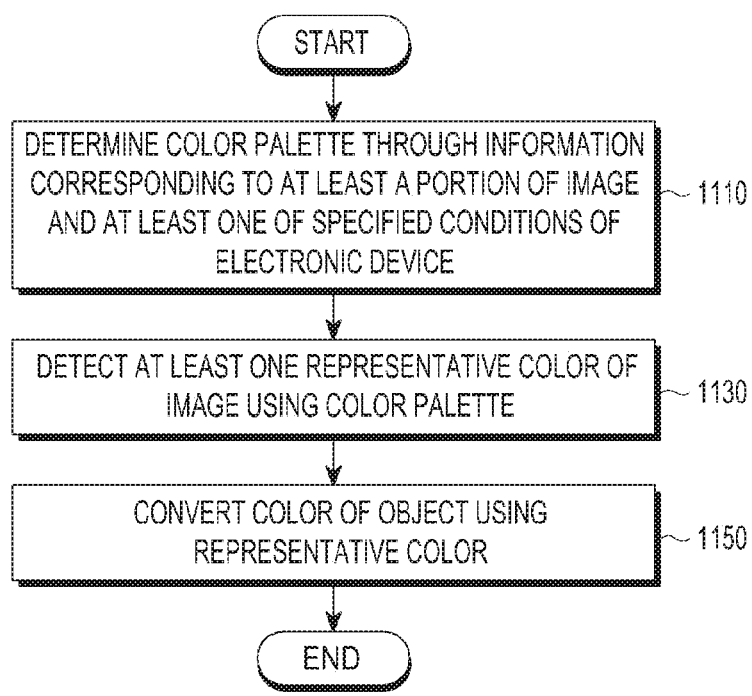
FIG. 11 is a flowchart illustrating a method of converting a color of an image according to an embodiment of the present disclosure.

FIG. 11 is a flowchart illustrating a method of converting a color of an image according to an embodiment of the present disclosure.

Referring to FIG. 11, in step 1110, an electronic device (e.g., the electronic device 401) determines a color palette through information corresponding to at least a portion of the image displayed on the display and at least one of specified conditions of the electronic device. For example, upon determining, based on the information corresponding to at least a portion of the image that the image is an image including a human's face, the electronic device may determine a color palette corresponding to a portrait image among specified color palettes.

In step 1130, the electronic device detects at least one representative color of the image using the color palette.

In step 1150, the electronic device converts the color of the object using the representative color.

The information corresponding to the image may include at least one of metadata of the image and a tag of the image.

The specified conditions of the electronic device may include at least one of memory information of the electronic device, CPU clock information of the electronic device, and power status information of the electronic device.

Detecting the at least one representative color of the image may include downscaling the image at a specified ratio; quantizing a color of the downscaled image using the color palette; calculating a histogram of the quantized color; and determining the representative color in the histogram.

Quantizing the color of the downscaled image may include quantizing the color of the downscaled image into a color of the color palette.

Converting the color of the object displayed on the screen of the electronic device may include converting the color of the object into a specified recommended color corresponding to the representative color depending on the similarity between the representative color and a basic color of the object.

Converting the color of the object displayed on the screen of the electronic device may include converting the color of the object into the specified recommended color corresponding to the representative color, determining that the similarity between the representative color and the basic color of the object is high, if a color distance value, calculated according to Equation (1) above, is less than or equal to a threshold.

Converting the color of the object displayed on the screen of the electronic device may include determining, if the representative color is a plurality, the degree of similarity between the representative color and the basic color of the object by applying a weight corresponding to a color ratio of each of the representative colors to a color distance value of each of the representative colors for the basic color.

Converting the color of the object displayed on the screen of the electronic device may include converting the color of the object into the specified recommended color corresponding to the representative color, determining that the similarity between the representative color and the basic color of the object is high, if a color distance value calculated by Equation (2) above is less than or equal to a threshold.

The image may include a scene included in a photo or a video, a wallpaper, a text, or an icon.

The electronic device may further include dividing the image into at least two regions, and detecting the at least one representative color of the image may detecting the at least one representative color for each of the divided regions.

Dividing the image into at least two regions may include dividing the image into at least two regions depending on a depth value of the image, a complexity of the image, or the specified number of regions.

Figure 12:
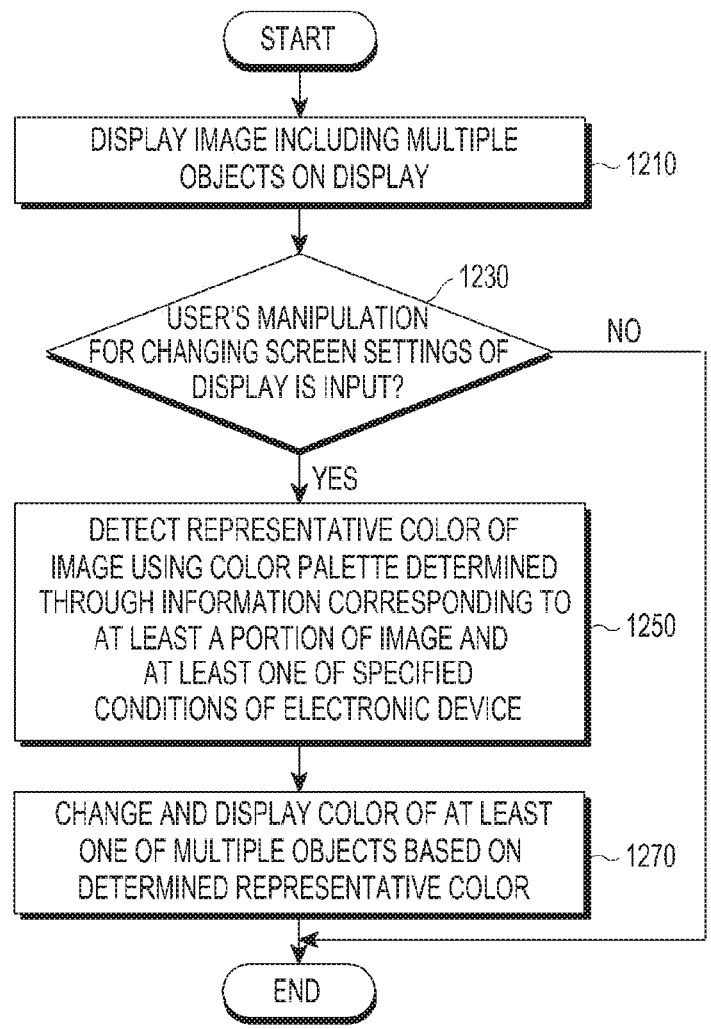
FIG. 12 is a flowchart illustrating a method of converting a color of an image in response to a user's manipulation according to an embodiment of the present disclosure.

FIG. 12 is a flowchart illustrating a method of converting a color of an image in response to a user's manipulation according to an embodiment of the present disclosure.

In step 1210, the electronic device 401 displays an image including a plurality of objects on the display 430.

In 1230, the electronic device determines whether a user's manipulation (i.e., user input) for changing screen settings of the display is received. If the user's manipulation for changing screen settings of the display is received, the electronic device performs 1250. If the user's manipulation for changing screen settings of the display is not received, the electronic device ends the operation.

In changing the screen settings a color of at least one of the objects displayed on the display may be changed. Further, an image on the wallpaper may be changed, or an icon image that is a shortcut key for execution of an application may be changed.

In step 1250, the electronic device detects a representative color of an image using a color palette that is determined through information corresponding to at least a portion of the image and at least one of specified conditions of the electronic device. The detection of the representative color is described herein above, so a further detailed description thereof is omitted for clarity and conciseness.

In step 1270, the electronic device changes and displays the color of at least one of the plurality of objects based on the determined representative color. The changing and displaying of the color of the object is described herein above, so a further detailed description thereof is omitted for clarity and conciseness.

FIGS. 13A to 16D are diagrams illustrating examples to which an operation of converting a color of an image is applied according to various embodiments of the present disclosure.

Figure 13A:
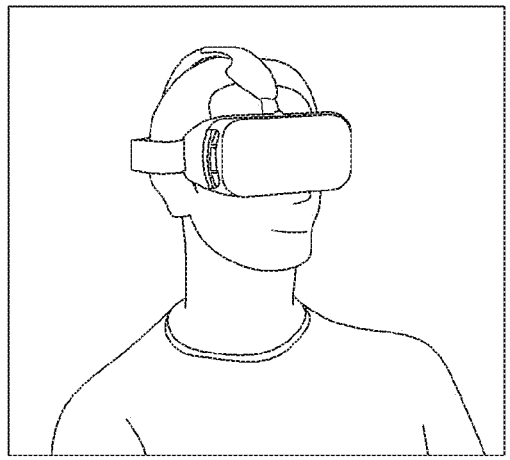
FIGS. 13A to 16D are diagrams illustrating examples to which an operation of converting a color of an image is applied according to an embodiment of the present disclosure.
Figure 13B:
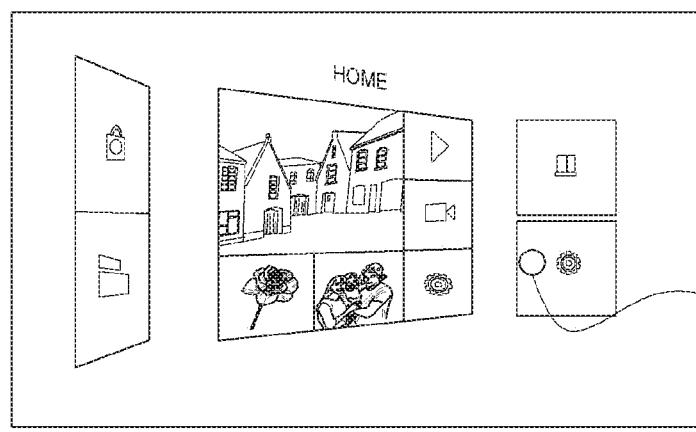
Figure 13C:
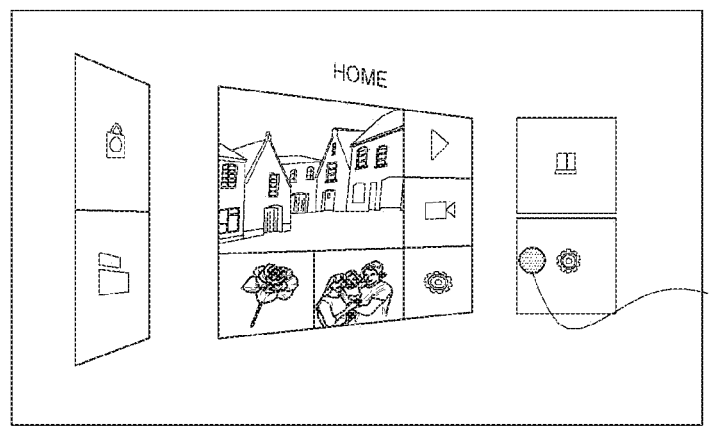

FIG. 13A depicts a user wearing a 3D virtual reality device, and FIG. 13B shows a 3D menu screen and a pointer 1311 having a first color (e.g., blue). Conventionally, since a menu and a pointer object for other settings in the virtual space have the fixed colors, if the color of the pointer object is similar to the color of the wallpaper (or the background screen), the visibility may be very low. By contrast, when an operation of converting a color of an image according to an embodiment of the present disclosure is applied, the electronic device may analyze the color of at least a portion of the image displayed in the virtual space, and use the results of the analysis to set the color of a pointer object 1313 to a second color (e.g., white), as shown in FIG. 13C. Accordingly, the conventional low-visibility disadvantages are overcome by an embodiment of the present disclosure.

As another example, a 3D virtual space may provide objects for a variety of control on the background screen having a more complex image, to provide a wide range of experiences to the user. If the operation technique for converting a color of an image according to an embodiment of the present disclosure is applied, the objects for control may be clearly expressed at all times, thereby improving the user's satisfaction while operating the virtual reality device.

Figure 14A:
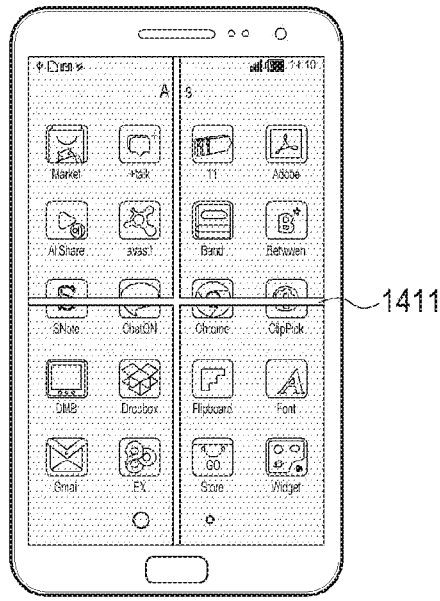
Figure 14B:
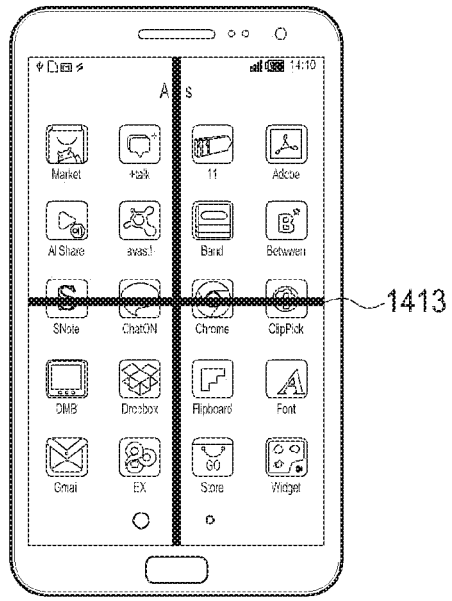

FIGS. 14A and 14B are diagrams illustrating examples of objects (also referred to as scanning bars) 1411 and 1413 that operate on the wallpaper of a smartphone, for users with hand-related disabilities. The objects 1411 and 1413 may slowly move along the x-axis and the y-axis, and if a touch is made somewhere on the screen, the movement may be stopped. For example, the user may select the point where the x-axis bar and the y-axis bar cross each other, to run the user desired icon. If the color of the object 1411 is set to white by default in the smartphone, and if the visibility is sufficiently ensured as in FIG. 14A, the smartphone may not change the color of the object 1411. However, if the wallpaper is changed as shown in FIG. 14B, the smartphone, by performing a method of converting a color of an image according to an embodiment of the present disclosure, may change the color of the object 1413 to a different color (e.g., blue), as in FIG. 14B, in order to provide greater visibility to the user.

Figures 15A, 15B, 15C:
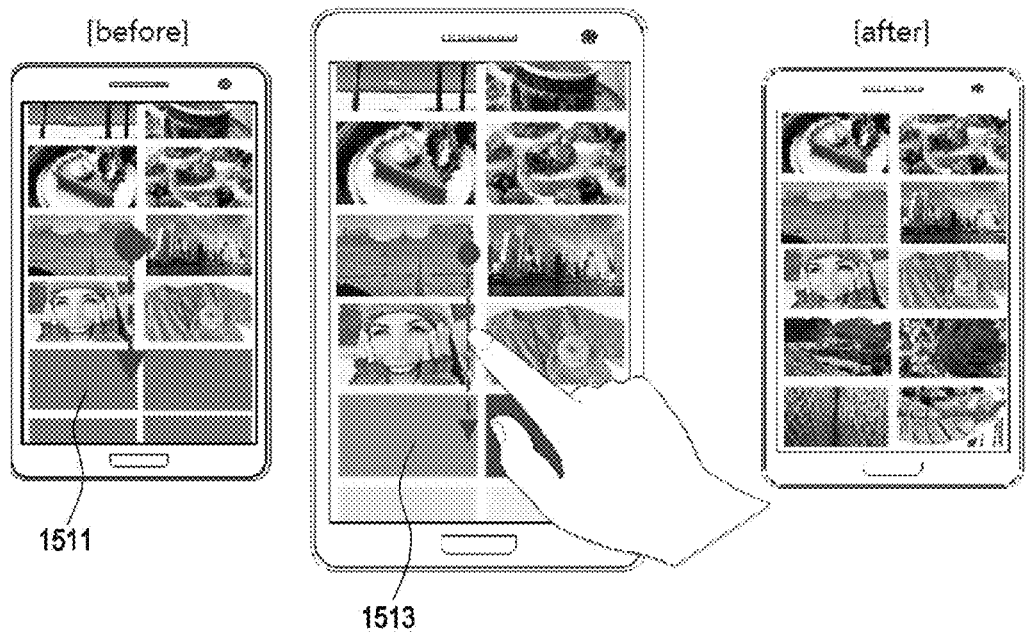

FIGS. 15A to 15C are diagrams illustrating thumbnail images displayed in an application, such as an image gallery application. If an electronic device runs a scroll operation in response to a user's input while thumbnail images are displayed on the screen of the electronic device, the electronic device may occasionally fail to continuously display the thumbnail images on the screen due, to its CPU characteristics. Conventionally, images of a specific color 1511, which are continuously specified on top of the thumbnail images being displayed on the existing screen, may be displayed as in FIG. 15A, and then, the thumbnail images to be displayed next, may be displayed on the screen as in FIG. 15C. However, if a method of detecting a representative color of an image according to an embodiment of the present disclosure is applied, representative colors of the thumbnail images to be continuously displayed next on top of the thumbnail images being displayed on the existing screen may be displayed as shown in FIG. 15B, and then, the thumbnail images to be displayed next may be displayed on the screen as in FIG. 15C. Accordingly, when performing the scroll operation, the electronic device may apply a representative color detection method according to an embodiment of the present disclosure, to display a more natural scrolling screen, for the user.

Figure 16A:
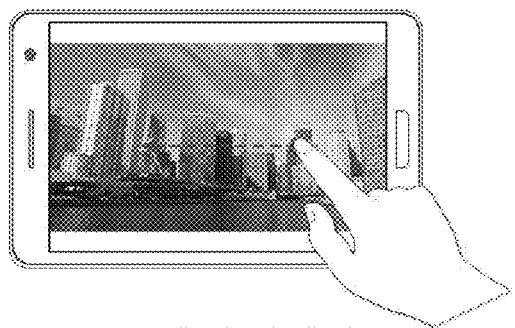
Figure 16B:
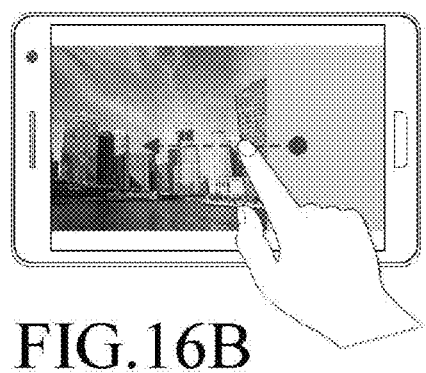
Figure 16C:
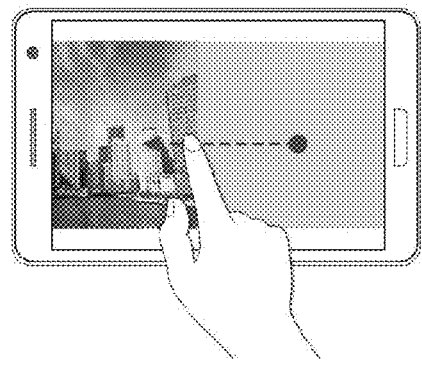
Figure 16D:
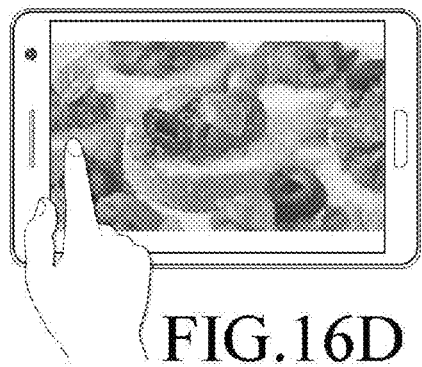
Figure 18A:
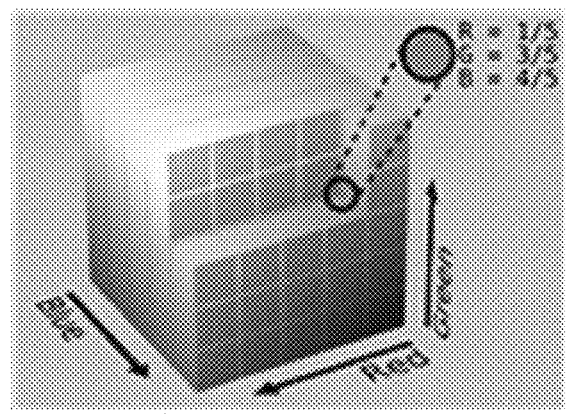
FIGS. 18A and 18B are diagrams illustrating a conventional RGB color space.
Figure 18B:
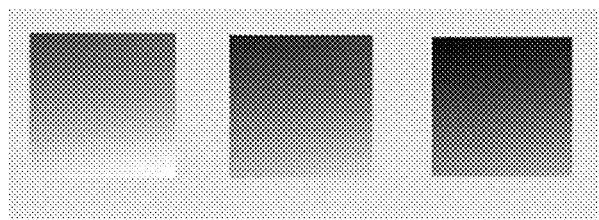
Figure 19A:
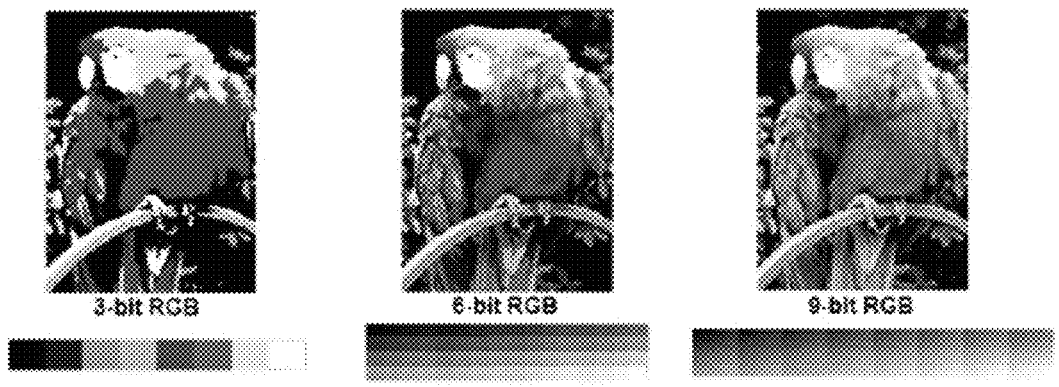
FIGS. 19A and 19B are diagrams illustrating a variety of conventional color palettes defined.
Figure 19B:
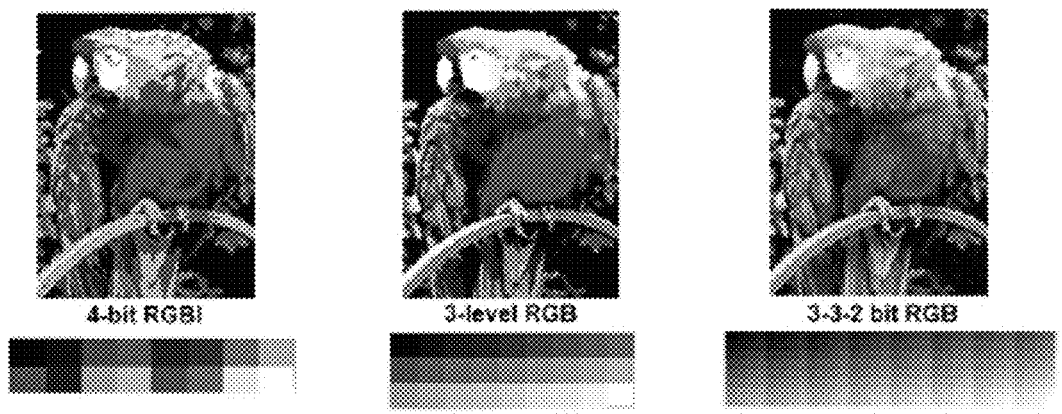

Referring to FIGS. 16A to 16D, if the electronic device performs a scroll operation in response to the user's manipulation while an image is displayed on the full screen of the electronic device, as shown in FIG. 16A, the electronic device, conventionally, may display an image of a specified color due to its CPU characteristics, and then, occasionally display an image to be displayed next as in FIG. 16D. However, if a method of detecting a representative color of an image according to an embodiment of the present disclosure is applied, the electronic device may detect a representative color from an image in FIG. 16D, which is to be displayed after the displayed existing screen in FIG. 16A, upon recognition of a user manipulation input for the scroll operation. Using the detected representative color, the electronic device may continuously display images in the order of FIG. 16B, FIG. 16C and FIG. 16D, after displaying the image in FIG. 16A. In FIG. 16B, half of the displayed existing screen corresponding to the scroll operation may be displayed on a part of the screen and the representative color may be displayed on the remaining part of the screen. In FIG. 16D, the electronic device may display the representative color having the transparency applied at a specified ratio for the image to be subsequently displayed. Accordingly, when performing the scroll operation, an electronic device according to an embodiment of the present disclosure may apply a representative color detection method, in order to display more natural screen switching for the user.

Representative color detection operations according to embodiments of the present disclosure may be used as a segmentation technique by being applied to the segmented regions of an image. This may be applied to detection and separation of objects in an image, and image matching.

The term 'module', as used herein may refer to a unit that includes, for example, one of, or a combination of, hardware, software, and firmware. The term 'module' may be interchangeably used with terms such as, for example, "unit", "logic", "logical block", "component", or "circuit". A module may be the minimum unit of an integrally constructed part, or a part thereof. The module may be the minimum unit for performing one or more functions, or a part thereof. The module may be implemented mechanically or electronically. For example, the module may include at least one of an application-specific integrated circuit (ASIC) chip, field-programmable gate arrays (FPGAs), or a programmable-logic device, which are known or will be developed in the future, and which perform certain operations.

At least a part of the device (e.g., modules or functions thereof) or method (e.g., operations) according to various embodiments of the present disclosure may be implemented by at least one command that is stored in computer-readable storage media in the form of, for example, a programming module. If the command is executed by one or more processors (e.g., the processor 120), the one or more processors may perform a function corresponding to the command. The computer-readable storage media may be, for example, the memory 130.

The computer-readable storage media may include magnetic media (e.g., a hard disk, a floppy disk, and magnetic tape), optical media (e.g., a compact disc read only memory (CD-ROM) and a digital versatile disc (DVD)), magneto-optical media (e.g., a floptical disk), and a hardware device (e.g., a read only memory (ROM), a random access memory (RAM) and a flash memory). The program command may include not only a machine code such as a code made by a compiler, but also a high-level language code that can be executed by the computer using an interpreter. The above-described hardware device may be configured to operate as one or more software modules to perform the operations according to various embodiments of the present disclosure, and vice versa.

A module or a programming module according to various embodiments of the present disclosure may include at least one of the above-described components, some of which may be omitted, or may further include additional other components. Operations performed by a module, a programming module or other components according to various embodiments of the present disclosure may be performed in a sequential, parallel, iterative or heuristic manner. Some operations may be performed in a different order or omitted, or other operations may be added, in accordance with embodiments of the present disclosure.

As is apparent from the foregoing description, methods and apparatuses for converting a color of an image according to various embodiments of the present disclosure may convert a color of an object (e.g., a text, or an icon that is a shortcut key for execution of an application) displayed on a screen of a variety of electronic devices including a mobile terminal, making it possible to ensure the visibility of the object in any wallpaper. Further, methods and apparatuses according to embodiments of the present disclosure may help improve visibility in consideration of a variety of design elements, for determining a color of an object. Since the API for color analysis of the wallpaper is not provided conventionally, use of various embodiments may help design a variety of UI/UX.

Representative color detection techniques according to various embodiments of the present disclosure may provide a method and electronic device for converting a color of an image so as to determine a quantized color palette depending on the condition of the electronic device to which the quantized color palette is applied, thereby satisfying the real-time and current consumption constraints. For example, the representative color detection technique according to various embodiments of the present disclosure may be implemented by a simple arithmetic operation in an electronic device such as a smartphone with a limited hardware environment, and may minimize the current consumption of the electronic device.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device comprising:
   a display; and
   a processor configured to execute instructions for performing steps of:
   displaying one or more images on the display;
   identifying a scroll operation corresponding to a user input for displaying at least one of a plurality of images subsequently following the one or more images;
   during the scroll operation for displaying the at least one of the plurality of images, displaying at least one of the one or more images and at least one object together on the display, each of the at least one object corresponding to one of the plurality of images and having one representative color of the corresponding one of the plurality of images; and
   in response to a completion of the scroll operation for displaying the at least one of the plurality of images, displaying the at least one of the one or more images and the at least one of the plurality of images together on the display, the at least one of the plurality of images being displayed in place of the at least one object.

2. The electronic device of claim 1, wherein displaying the at least one object comprises, during the scroll operation, obtaining the one representative color of the one of the plurality of images using at least one of information corresponding to at least a portion of the one of the plurality of images.

3. The electronic device of claim 2, wherein obtaining the one representative color comprises, during the scroll operation, obtaining the one representative color of the one of the plurality of images using a color palette that is determined through the information corresponding to the at least the portion of the one of the plurality of images.

4. The electronic device of claim 2, wherein obtaining the one representative color comprises, during the scroll operation, obtaining the one representative color of the one of the plurality of images using a color palette that is determined through at least one of specified conditions of the electronic device.

5. The electronic device of claim 2, wherein the information corresponding to the at least the portion of the one of the plurality of images comprises at least one of metadata of the one of the plurality of images or a tag of the one of the plurality of images.

6. The electronic device of claim 3, wherein the processor is further configured to execute instructions for performing steps of downscaling the one of the plurality of images at a specified ratio, quantizing at least one color of the downscaled image using the color palette, calculating a histogram of the at least one quantized color, and obtaining the one representative color according to the histogram.

7. The electronic device of claim 4, wherein the specified conditions of the electronic device comprise at least one of memory information of the electronic device, central processing unit (CPU) clock information of the electronic device, and power status information of the electronic device.

8. The electronic device of claim 1, wherein the processor is further configured to execute instructions for performing steps of determining a degree of similarity between a plurality of representative colors and a basic color of a plurality of visual elements included in the plurality of images by applying a weight corresponding to a color ratio of each of the plurality of representative colors to a color distance value of each of the plurality of representative colors for the basic color.

9. The electronic device of claim 1, wherein each of the plurality of images comprises at least one of a scene included in a photo or a video, a wallpaper, a text, and an icon.

10. The electronic device of claim 1, wherein the processor is further configured to execute instructions for performing steps of dividing each of the plurality of images into at least two regions, and obtaining at least two representative colors, each corresponding to the divided at least two regions respectively.

11. The electronic device of claim 10, wherein dividing the each of the plurality of images into the at least two regions comprises dividing the each of the plurality of images into the at least two regions depending on a depth value of the each of the plurality of images, a complexity of the each of the plurality of images, or specified number of regions.

12. A method for displaying a representative color of an image in an electronic device, the method comprising:
  executing instructions by a processor of the electronic device for performing steps of:
    displaying one or more images on a display;
    identifying a scroll operation corresponding to a user input for displaying at least one of a plurality of images subsequently following the one or more images;
    during the scroll operation for displaying the at least one of the plurality of images, displaying at least one of the one or more images and at least one object together on the display, each of the at least one object corresponding to one of the plurality of images and having one representative color of the corresponding one of the plurality of images; and
    in response to a completion of the scroll operation for displaying the at least one of the plurality of images, displaying the at least one of the one or more images and the at least one of the plurality of images together on the display, the at least one of the plurality of images being displayed in place of the at least one object.

13. The method of claim 12, wherein displaying the at least one object comprises, during the scroll operation, obtaining the one representative color of the one of the plurality of images using at least one of information corresponding to at least a portion of the one of the plurality of images.

14. The method of claim 13, wherein obtaining the one representative color comprises, during the scroll operation, obtaining the one representative color of the one of the plurality of images using a color palette that is determined through the information corresponding to the at least the portion of the one of the plurality of images.

15. The method of claim 13, wherein obtaining the one representative color comprises, during the scroll operation, obtaining the one representative color of the one of the plurality of images using a color palette that is determined through at least one of specified conditions of the electronic device.

16. The method of claim 13, wherein the information corresponding to the at least the portion of the one of the plurality of images comprises at least one of metadata of the one of the plurality of images or a tag of the one of the plurality of images.

17. The method of claim 15, wherein the specified conditions of the electronic device comprise at least one of memory information of the electronic device, central processing unit (CPU) clock information of the electronic device, and power status information of the electronic device.

18. The method of claim 14, wherein obtaining the one representative color of the one of the plurality of images comprises:
  downscaling the one of the plurality of images at a specified ratio;
  quantizing at least one color of the downscaled image using the color palette;
  calculating a histogram of the at least one quantized color; and
  obtaining the one representative color according to the histogram.

19. The method of claim 12, further comprising executing instructions for performing steps of determining a degree of similarity between a plurality of representative colors and a basic color of a plurality of visual elements included in the plurality of images by applying a weight corresponding to a color ratio of each of the plurality of representative colors to a color distance value of each of the plurality of representative colors for the basic color.

20. The method of claim 12, wherein each of the plurality of images comprises at least one of a scene included in a photo or a video, a wallpaper, a text, and an icon.

21. The method of claim 12, further comprising executing instructions for performing steps of dividing each of the plurality of images into at least two regions, and
  obtaining at least two representative colors, each corresponding to the divided at least two regions, respectively.

22. The method of claim 21, wherein dividing the each of the plurality of images into the at least two regions comprises dividing the each of the plurality of images into the at least two regions depending on a depth value of the each of the plurality of images, a complexity of the each of the plurality of images, or a specified number of regions.

23. A server comprising:
  a memory; and
  a processor configured to generate and transmit instructions for performing steps of:
    displaying one or more images on a display;
    identifying a scroll operation corresponding to a user input for displaying at least one of a plurality of images subsequently following the one or more images;
    during the scroll operation for displaying the at least one of the plurality of images, displaying at least one of the one or more images and at least one object together on the display, each of the at least one object corresponding to one of the plurality of images and having one representative color of the corresponding one of the plurality of images; and
    in response to a completion of the scroll operation for displaying the at least one of the plurality of images, displaying the at least one of the one or more images and the at least one of the plurality of images together on the display, the at least one of the plurality of images being displayed in place of the at least one object.

24. The server of claim 23, wherein displaying the at least one object comprises, during the scroll operation, obtaining the one representative color of the one of the plurality of images using at least one of information corresponding to at least a portion of the one of the plurality of images.

25. The server of claim 24, wherein the information corresponding to the at least the portion of the one of the plurality of images comprises at least one of metadata of the one of the plurality of images or a tag of the one of the plurality of images.

26. The non-transitory computer-readable storage medium of claim 1, wherein displaying the at least one object comprises, during the scroll operation, obtaining the one representative color of the one of the plurality of images using at least one of information corresponding to at least a portion of the one of the plurality of images.

27. The non-transitory computer-readable storage medium of claim 26, wherein the information corresponding to the at least the portion of the one of the plurality of images comprises at least one of metadata of the one of the plurality of images or a tag of the one of the plurality of images.

28. A non-transitory computer-readable storage medium for storing a program, the program including executable instructions which, when executed by at least one processor of an electronic device, control the electronic device to perform:

displaying one or more images on a display;

identifying a scroll operation corresponding to a user input for displaying at least one of a plurality of images subsequently following the one or more images;

during the scroll operation for displaying the at least one of the plurality of images, displaying at least one of the one or more images and at least one object together on the display, each of the at least one object corresponding to one of the plurality of images and having one representative color of the corresponding at least one of the plurality of images; and in response to a completion of the scroll operation for displaying the at least one of the plurality of images, displaying the at least one of the one or more images and the at least one of the plurality of images together on the display, the at least one of the plurality of images being displayed in place of the at least one object.

* * * * *